United States Patent
Harenberg et al.

[11] Patent Number: 5,544,311
[45] Date of Patent: Aug. 6, 1996

[54] ON-CHIP DEBUG PORT

[75] Inventors: Donald D. Harenberg, Placentia; George A. Watson, Fullerton; Keith M. Bindloss, Irvine; Dale E. Folwell, Placentia, all of Calif.

[73] Assignee: Rockwell International Corporation, Seal Beach, Calif.

[21] Appl. No.: 526,472

[22] Filed: Sep. 11, 1995

[51] Int. Cl.$^6$ .................................................. G06F 11/00
[52] U.S. Cl. ............................ 395/183.16; 395/183.06
[58] Field of Search ........................ 395/183.16, 183.06, 395/185.03, 185.04, 183.13, 183.21; 371/22.1, 22.5, 22.6

[56] References Cited

U.S. PATENT DOCUMENTS

| | | | |
|---|---|---|---|
| 4,641,308 | 2/1987 | Sacarisen et al. | 395/183.06 |
| 5,053,949 | 10/1991 | Allison et al. | 364/200 |
| 5,084,814 | 1/1992 | Vaglica et al. | 395/325 |
| 5,088,027 | 2/1992 | Tanagawa et al. | 395/183.03 |
| 5,157,781 | 10/1992 | Harwood et al. | 395/183.06 |
| 5,253,255 | 10/1993 | Carbine | 395/183.06 |
| 5,416,919 | 5/1995 | Ogino et al. | 395/183.06 |
| 5,473,754 | 12/1995 | Folwell et al. | 395/183.21 |
| 5,479,652 | 12/1995 | Dreyer et al. | 395/183.06 |
| 5,491,793 | 2/1996 | Somasundaram et al. | 395/183.21 |

*Primary Examiner*—Robert W. Beausoliel, Jr.
*Assistant Examiner*—Joseph E. Palys
*Attorney, Agent, or Firm*—George A. Montanye; David J. Arthur

[57] ABSTRACT

A debug port in accordance with the invention provides circuitry for enabling system (hardware and software) development within an inaccessible computer processor. In one embodiment, a debug port is incorporated within the internal logic of a single-chip, reduced instruction set signal processor referred to as the signal processor. A fully implemented debug port is comprised of five interacting functional elements: debug bus unit (DBU), debug command unit (DCU), debug instruction Unit (DIU), debug inject/extract unit (DJU), and a debug flow unit (DFU). The DBU provides circuitry for buffering data received from the signal processor and other functional elements within the debug port as well as accepting data from an external source. The DBU provides for off-chip connections. The DCU provides circuitry for decoding and executing debug commands received by the debug port. The DIU provides circuitry to insert one or more instructions with, or without, data into the instruction stream of the signal processor. The DJU provides circuitry for injecting external sources of information (e.g., an analog input signal, external control signals, or repetitious data signals) into the signal processor under program control. The DFU provides circuitry for monitoring program/task execution.

50 Claims, 6 Drawing Sheets

ON-CHIP DEBUG PORT

The following co-pending U.S. patent applications disclose various aspects of an on-chip debug circuit and are hereby included in their entirety by reference: (i) Ser. No. 08/079,580 filed on Jun. 21, 1993, entitled "Debugging Marker System," by Watson, Bindloss, and Folwell, and (ii) Ser. No. 08/155,891, filed Nov. 23, 1993, entitled "Branch Decision Encoding Scheme," by Folwell, Clark, and Harenberg. All cited pending applications are commonly assigned with this application.

FIELD OF THE INVENTION

The invention relates in general to the field of computer system (hardware and software) development and, more particularly, to an on-chip debug circuit capable of providing real-time acquisition of processor state information and the real-time execution of debug commands.

BACKGROUND OF THE INVENTION

One conventional technique to debug a computer system (both hardware and software) is to connect a logic analyzer to a processor's address bus, data bus and certain control function signals. In this way, a development engineer can monitor the state of these parameters in real-time. A fundamental restriction of this technique, particularly in single-chip, very large scale integrated (VLSI) processors, is that only those signals available at the processor's external pins may be interrogated.

As processor design and software complexity has increased, the efficiency and capability of debugging such systems based solely on the information provided at a processor's external pins has decreased. To debug today's complex computer systems a development engineer needs to monitor a large number of variables (e.g., data, address, status, and control register contents), many of which are available only internal to the processor. Accessing these variables often requires that a number of debugging techniques be used.

In the breakpoint technique, the processor is run (i.e., a program is executed) at normal operating speeds up to a breakpoint instruction. At the breakpoint, program execution halts, processor states are preserved, and the development engineer then reviews many of the crucial parameters needed to debug the system. This technique, however, is fundamentally a static approach to debugging. Some problems that occur in complex modern processors, such as signal processors, often do not lend themselves to this stop-and-go style of analysis. First, the breakpoint technique is very slow. Second, it disrupts continuous, realtime system evaluation. For instance, breakpoint techniques often can not be used effectively to debug a signal processor designed to evaluate/process an analog signal because stopping the processor at a breakpoint disrupts the acquisition and processing of the signal itself. The processor can not, therefore, be evaluated as it performs its designed task.

A second technique, known as the code-substitution technique, a development engineer identifies program code associated with a variable, or variables, of interest. For instance, a program instruction that may modify the state of a processor's internal status register. A software routine is then written and substituted for the identified program instruction. The processor/program is then run at normal operating speeds. When the program gets to the point where the identified instruction would be executed, the substitute routine is executed instead. The substitute routine typically causes the processor to output the status of the identified variable(s) and other possibly relevant processor state information to a buffer memory. Afterwards program execution continues in normal fashion. Drawbacks to this technique include: (1) it adds extra cycles to the processor's operation which may disrupt the real-time evaluation of the computer system; (2) it is limited to the capture of variable information that is explicitly manipulated by the target program; mid (3) it has the problem of getting the captured data out of the buffer memory and to a debug system for evaluation by the development engineer.

A third debug technique is embodied in the IEEE Test Port and Boundary-Scan Architecture (IEEE standard no. 1149.1). This architecture specifies the use of special purpose hardware inside a processor which captures the processor's program counter at program execution discontinuities. This information is then output to an off-processor device through a serial port. Drawbacks to this technique include its limited capacity of information capture and its slow speed. Because the test port operates in serial fashion it is often not fast enough to keep up with real-time systems. This is especially true for real-time signal processors.

Another conventional debug technique is the use of in-circuit emulator (ICE) devices. While ICE devices typically provide access to more outputs than a processor's external pins, they are still quite limited. Further, because it is very difficult to design and build an emulator that is capable of executing at the same speed as the target system, this technique is often not capable of performing real-time debugging.

The aforementioned difficulty of monitoring, testing, and controlling (i.e., debugging) the operation of a computer system has increased significantly with the advent of modem single-chip pipelined computer processors. Modem processor designs are very complex, often utilizing a number of different internal data and address buses and registers that, because of pin count restrictions and operational speeds, are not available for off-chip monitoring. An apparatus and means for the real-time debugging of a complex processor (and software) that overcomes the aforementioned limitations is the subject of the instant invention.

SUMMARY OF THE INVENTION

The instant invention is directed to a means of computer hardware and software development for use within an inaccessible computer processor. A preferred embodiment the invention, referred to generically as an on-chip debug port or more simply a debug port, is incorporated within the internal logic of a single-chip, reduced instruction set signal processor. A complete debug port's functionality is provided via the interaction of five interconnected functional elements.

The debug bus unit (DBU) provides a means for communicating with an external interface module (IMod) and debug workstation. It buffers and outputs data collected from the signal processor; and inputs commands and data for use in the debug port, and instructions and data for use in the signal processor.

The debug command unit (DCU) provides a means for decoding commands that originate from the IMod or the signal processor. The DCU executes those commands that are directed to it, and passes on those that are directed to the IMod or other debug port units. The DCU can also output data that has been written into one of its internal registers by the signal processor.

The debug instruction Unit (DIU) provides a means for inserting an instruction with, or without, data into the instruction stream of the signal processor. Types of instructions that are of primary interest include: (1) those that move data to debug port registers from internal signal processor registers and memory, and (2) those that alter signal processor program flow. The DIU can also be used for transferring data into, and out of, the signal processor.

The debug inject/extract unit (DJU) provides a means for injecting external sources of information (e.g., a digitized representation of an analog input signal, external control signals, or repetitious data signals) into the signal processor under program control. This can be particularly important as a means of providing simulated input data during program development. The DJU can also supply an executing program with data that would normally be provided via a routine. In this way, the existence of a yet to be developed routine can be simulated. This feature allows different developers to debug different aspects of a system in parallel, without waiting for sources of input to be fully developed. Additionally, the DJU can channel or extract data, in real-time, that is generated by an executing signal processor program/task to the IMod or debug workstation.

The debug flow unit (DFU) provides a means for monitoring program/task flow by encoding task branch decisions so that the signal processor's program counter contents can be recorded, compressed and transmitted efficiently to an external debug workstation, which then recreates the path through the device's program from the compressed information, and the original compiled and/or assembled program. The DFU is the subject of co-pending U.S. patent application Ser. No. 08/155,891.

FUNCTIONAL DESCRIPTION OF A SPECIFIC EMBODIMENT

One illustrative embodiment of the invention is described below in functional terms as it might be implemented in an on-chip debug system for a VLSI RISC signal processor. In the interest of clarity, not all features of an actual implementation are described in this specification. It will of course be appreciated that in the development of any such actual device (as in any development project), numerous implementation-specific decisions must be made to achieve the developers' specific goals, such as compliance with system- and business-related constraints, which will vary from one implementation to another. Moreover, it will be appreciated that such a development effort might be complex and time-consuming, but would nevertheless be a routine undertaking of computer design for those of ordinary skill having the benefit of this disclosure.

6.1 Introduction

On-chip debug circuitry in accordance with the invention relates to a means and apparatus for monitoring and controlling program flow within an inaccessible computer processor. An illustrative on-chip debug circuitry in accordance with the invention, referred to as a debug port, is incorporated within the internal logic of a single-chip, reduced instruction set signal processor. It is a goal of the debug port that debug operations proceed in real-time and with no significant intrusion to the operation of the signal processor. It will be appreciated by those of ordinary skill that the debug port can be implemented, with equal utility, within any processor system and is not, therefore, limited to a single-chip signal processor.

In addition, a debug port can be used to inject a debug instructions into the signal processor's instruction stream, inject data (e.g., to simulate input/output data), and manipulate signal processor input control signals (e.g., causing the processor to enter or leave the HALT or BREAK mode, cause a signal s processor exception to occur; switch from internal processor ROM to external emulation ROM memory, etc.) in real-time to affect signal processor behavior.

Figure 1:
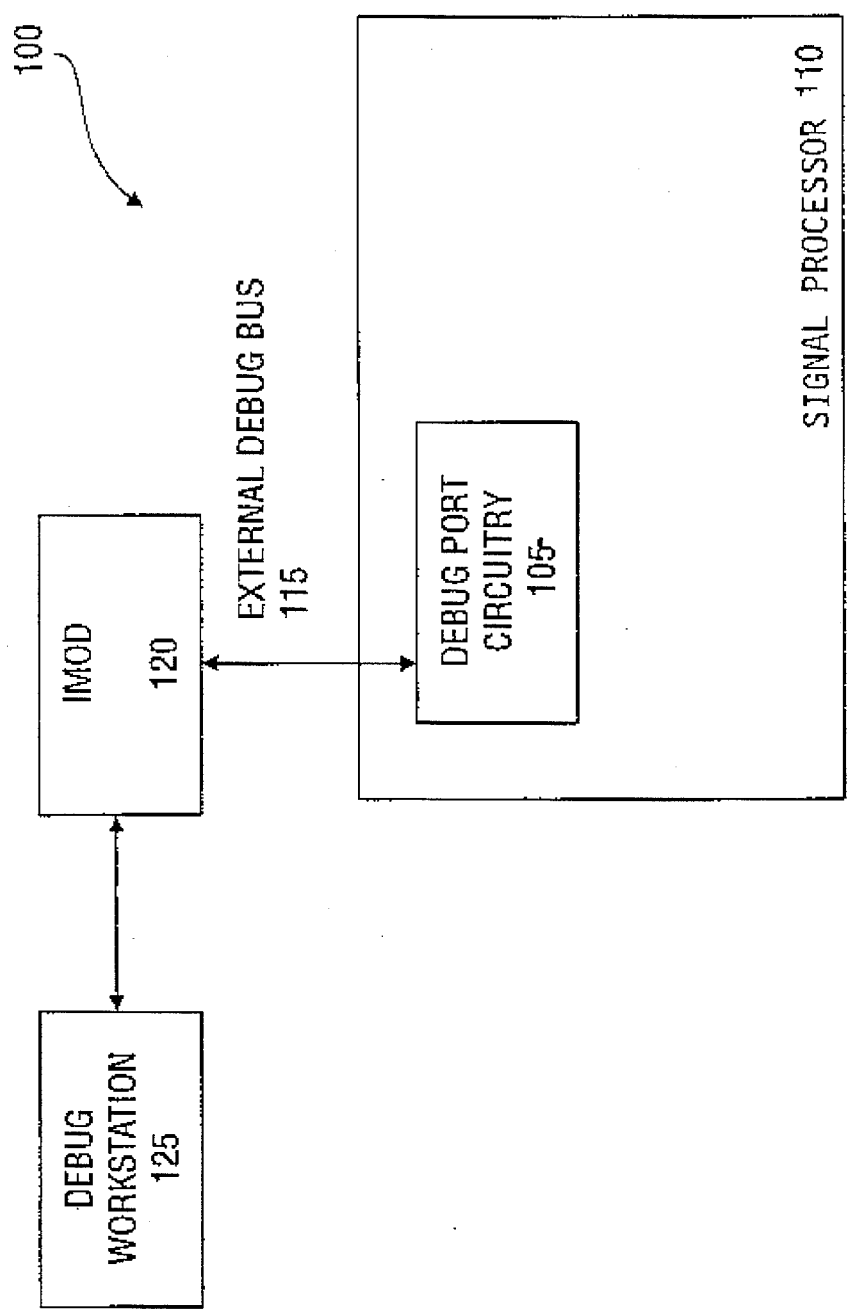
FIG. 1 is a block diagram of a debug system in accordance with the invention.

As shown in FIG. 1, an on-chip debug system 100, in accordance with the invention, can be functionally divided into four pans: (1) debug port circuitry 105 that is co-resident with the signal processor circuitry 110, (2) an external debug bus and protocol 115, (3) an external interface module (IMod) 120 and (4) a debug workstation 125.

The debug workstation 125 is used to compile and/or assemble signal processor programs, provide non real-time processing of debug information, and presentation of debug results to a system user/engineer. A typical debug workstation can be, for instance, a Sun Microsystem's "SPARC" system.

The IMod 120 provides a means for interfacing the non-real-time processing of the debug workstation 125 and the real-time, high-speed, operation of the debug port circuitry 105 and signal processor 110. To accomplish this, the IMod provides a means for buffering: (1) debug information destined for the debug port and (2) real-time information received from the debug port circuitry.

In addition, the IMod 120 can be used to dynamically alter operation of the debug port 105 as a function of task execution (i.e., the program being debugged). For instance, suppose a task/program consists of two different routines, A and B. Further suppose, that a specified set of program/ processor variables are to be analyzed during execution of routine A, and another set of variables are to be analyzed during execution of routine B. (The two sets of variables do not have to be entirely distinct). As each routine is entered during normal task execution, the IMod can receive notice of the routine entry and, in response, cause the on-chip debug circuitry to selectively record/monitor only those variables desired. In support of this feature, the IMod can provide a temporary storage of debug setup data that, when needed, is transmitted to the debug port. This feature saves signal processor chip real estate that would be needed for memory if multiple debug setups where to be stored within the debug port circuitry itself and overcomes the speed limitations/delays of retrieving debug setups from the debug workstation.

The external debug bus and protocol 115 provides a means for transmitting as much information as possible between the IMod 120 and the debug port circuitry 105, within the constraints of pin count. In one exemplary embodiment, the external debug bus is a 12 bit bus (8 data bits and 4 control bits) and the protocol implemented is an asynchronous byte-wide protocol. A benefit of this approach is that as processor speeds increase, a corresponding increase in IMod speed may not also be required.

Figure 2:
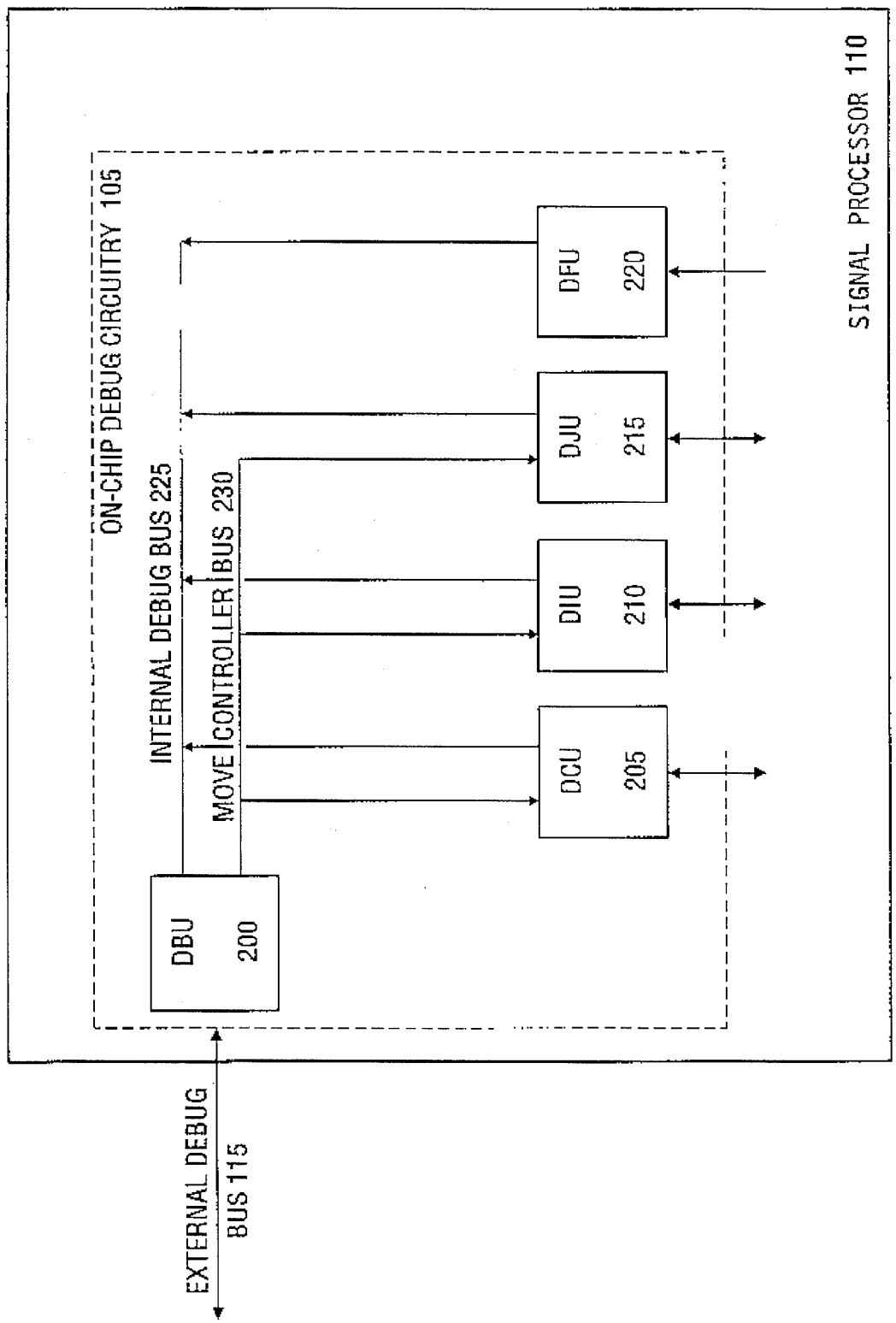
FIG. 2 is a block diagram of on-chip debug circuitry in accordance with the invention.

As shown in FIG. 2, the debug port 105 is itself comprised of a number of functional elements including two buses, the internal debug bus 225 and the move controller bus 230. Arrowheads indicate the direction of information flow between each debug circuit component and these buses. Although they are not shown, there are also a number of control and data lines required between these functional elements.

200 Debug Bus Unit (DBU). Provides a means for communicating with the IMod 120 and debug workstation 125. It buffers and outputs data collected from the signal processor 110; and inputs commands and data for use in the debug port 105, and instructions and data for use in the signal processor.

205 Debug Command Unit (DCU). Provides a means for decoding commands that originate from the IMod 120 or the signal processor 110. The DCU executes those commands that are directed to it, and passes on those that are directed to the IMod or other debug port units. It can also output data that has been written into one of its internal registers by the signal processor.

210 Debug Instruction Unit (DIU). Provides a means to insert an instruction, with or without data, into the instruction stream of the signal processor 110. Types of instructions that are of primary interest include: (1) those that move data to debug port registers from internal signal processor registers and memory, and (2) those that alter signal processor program flow. A register internal to the DIU can also be used for transferring data into, and out of, the signal processor.

215 Debug Inject/Extract Unit (DJU). Provides a means for injecting external sources of information (e.g., a digitized representation of an analog input signal, external control signals, or repetitious data signals) to the signal processor 110 under program control. This can be particularly important as a means of providing simulated input data during program development. The DJU can also supply an executing task/program with data that would normally be provided via a routine. In this way, the existence of a yet to be developed routine can be simulated. This feature allows different developers to debug different aspects of a system in parallel, that is, without waiting for sources of input to be fully developed. Additionally, the DJU can channel or extract data, in real-time, that is generated by an executing signal processor program to the IMod 120 or debug workstation 125.

220 The debug flow unit (DFU) provides a means for monitoring program/task flow by encoding task branch decisions so that the signal processor's program counter contents can be recorded, compressed and transmitted efficiently to an external debug workstation 125, which then recreates the path through the device's program from the compressed information, and the original compiled and/or assembled program. The DFU is the subject of co-pending U.S. patent application Ser. No. 08/155,891.

In a current embodiment, the internal debug bus 225 and move controller bus 230 are 16 bits wide while the external debug bus 115 is 12 bits wide (8 bits data and 4 bits control). The instant invention is directed to the implementation of an on-chip debug circuitry 105. To this end, the following disclosure will focus on this aspect of the debug system as outlined in FIG. 1.

6.2 Communication Among Debug System Components

The process of debugging a computer system is, in one sense, the process of capturing, transferring and interpreting data associated with the run-time state of a computer system's processor. In a debug system in accordance with the invention, data transmission occurs in the form of packets. It is through the two-way transmission of information (realized in packets) between a development engineer and the debug system that the process of debugging is effected.

In one illustrative embodiment of the invention, each packet is comprised of a 16-bit (half-word) header followed by an integral number of data half-words. The header is comprised of various fields, including a 3-bit field that indicates the number of half-words that follow the header. Other information that may be encoded in the header, includes:

1. The intended packet destination, e.g., DIU 210 or IMod 120.
2. The source of the data in the packet, e.g. one of the registers internal to the DCU 205.
3. An optional command such as, for example, to set a bit in a specified debug port register or to stop/start the signal processor. Commands can be a variable number of bits in length.
4. A description of the data that follows the header. For example, which register within a specified debug port functional element (e.g., DJU 215) the data is to be placed in.

It will be appreciated by one of ordinary skill that the precise encoding scheme employed is discretionary and subject to the particular preferences of the design engineer.

6.3 Debug Bus Unit (DBU)

Figure 3:
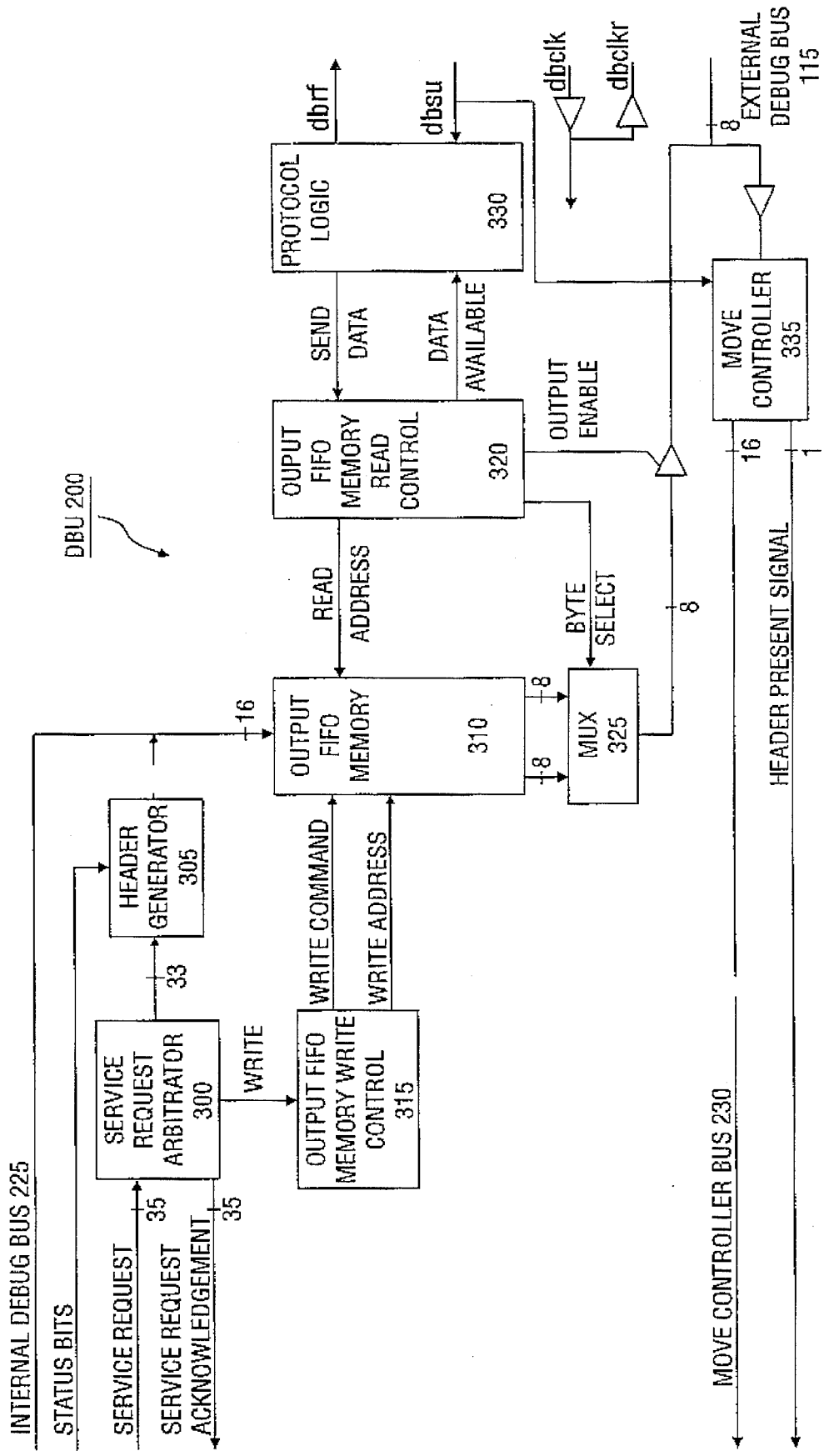
FIG. 3 is a block diagram of an on-chip debug circuit's debug bus unit (DBU) in accordance with the invention.

As previously discussed, the debug bus unit (DBU) 200 serves to buffer data between the debug port 105 and the off-chip IMod 120 and debug workstation 125. An expanded view of the DBU is shown in FIG. 3, the elements of which are described below.

300 Service Request Arbitrator. All units within the debug port, except for the DBU, have multiple service request (SR) outputs. These outputs are used to request that the DBU permit transfer of data from a register within the requesting unit, to the DBU's output FIFO 310. The service request arbitrator periodically monitors the status of all its service request inputs. After detecting assertion of one or more service request inputs, the arbitrator 300 prioritizes the requests, selecting one at a time to acknowledge. Acknowledging a SR is accomplished by asserting the appropriate signal request acknowledge signal to the requesting unit. In one embodiment, the SR arbitrator receives 35 different SR signals as described in Section 7. Each service request signal has an equivalent service request acknowledgment signal.

305 Header Generator. All packets destined for the output FIFO memory 310 have a header associated with them. (Some packets can be comprised of only a single header.) It is the function of the header generator to generate headers for nearly all packets written into the output FIFO memory. In one embodiment of the invention, two packets are sent to the DBU 200 with headers already included. These packets are issued by the DCU 205, but they are written into the DCU by the signal processor 110. The SR arbitrator 300 identifies the requesting module to the header generator so that it can generate the appropriate header. In one embodiment, a separate line for each SR input is provided (except for the two packets mentioned above) between the arbitrator 300 and header generator. Some headers have status bits included in them. For example, if the signal processor attempts to write a debug port register before its previously written data is sent to the output FIFO, then an overwrite attempt status bit is set in that message's header. A set "overwrite attempt status bit" indicates that the next packet which would have come from that register is missing because the overwrite was blocked. (Status information can be supplied to the header generator from most of the units within the debug port.)

310 Output FIFO Memory. Used to store data being sent from the debug port to the IMod 120 and debug workstation 125. As shown in FIG. 3, the output FIFO memory receives data input via the 16-bit internal debug bus 225. In the current embodiment, the FIFO has sufficient memory to store sixteen 16-bit half-words. Each time a half-word is written into the FIFO memory a counter is incremented. Each time a half-word is read out of the FIFO the same counter is decremented. Thus, if the counter is positive there is data in the FIFO that is ready to be sent out of the debug port.

315 Output FIFO Write Control. During operations which write data into the output FIFO memory 310, this circuit is responsible for generating a FIFO write signal and an appropriate address signal for the output FIFO memory 310. The FIFO write controller increments its address counter after each 16-bit half-word is written into the FIFO memory. After writing to the highest FIFO memory, the next address generated is the FIFO's lowest address. This implements a circular buffer architecture.

320 Output FIFO Read Control. During operations which read from the output FIFO memory 310, the read control circuit is responsible for (1) generating the output FIFO memory address which is to be read and (2) generating a MUX control signal which allows the FIFO's 16-bit half-words to be broken into two 8-bit bytes for transmission over the debug port's external 8-bit output bus 115. The MUX signal ensures that the most significant byte is transmitted first followed by the half-word's least significant byte. The read controller's address generation wraps-around in a manner similar to the write controller 315.

325 MUX. Physical hardware responsible for convening output FIFO memory 16 bit half-words into two consecutive 8-bit bytes as discussed above.

330 Protocol Logic. Mediates the transfer of data from the output FIFO memory 310 to the IMod 120. This is accomplished by the transmitting a request to send signal to the IMod 120 on the dbrf output line when data is first written into the output FIFO, and outputting the data after detecting an OK to send signal from the IMod on the dbsu input line.

335 Move Controller. The IMod 120 is free to transmit data to the debug port any time data is not being transferred from the debug port. Data sent to the debug port from the IMod is passed through the move controller, where it is synchronized with the internal debug port clock and converted from 8-bit bytes to 16-bit half-words. On leaving the move controller, the data is placed onto the 16-bit move controller bus 230. The move controller also generates a "header present" signal which is asserted whenever a message header is on the move controller bus.

As shown in FIG. 3, the DBU 200 interfaces to the external debug bus port 115 via a series of control and data lines. In the present embodiment, external interface lines include (1) dbsu and dbrf lines to implement data handshaking between the debug port 105 and IMod 120, (2) dbclk and dbclkr lines to clock data into and out of the debug port respectively, and (3) the 8-bit data bus 115. The DBU also interfaces to the debug port's internal debug bus 225 and move controller bus 230 as shown in FIG. 2.

6.3(a) Data Transfer From the Debug Port to the IMod

For illustrative purposes, consider the case where the signal processor 110 writes data into register DJ0 605 in the DJU 215. (Detailed information on the DJU 215 is given below.) This constitutes an extract operation, i.e. the debug port is extracting data/information from the signal processor. When the write occurs, the DJU generates a service request signal (asserts djs0.sr) which is received by the service request arbitrator 300. The arbitrator sends an acknowledge signal to the DJU and, at the same time, signals the header generator 305 to generate an appropriate header for the service request. The header generator places the appropriate header into the output FIFO memory 310.

When the DJU 215 receives the DBU's acknowledge signal it first waits until the header is written into the output FIFO, and then places the contents of register DJ0 605 onto the internal debug bus 225. Since all DJU registers are 32-bits and the internal debug bus is 16-bits, each 32-bit data word is placed on the internal debug bus as two sequential 16-bit half-words. The output FIFO write controller 315 controls the writing of the data into the output FIFO memory 310. If the output FIFO was previously empty, as soon as the header is written into the output FIFO memory, the protocol logic 330 notifies the IMod 120 (via the dbrf signal) that the debug port has data available.

When the protocol logic 330 receives an "OK to send" signal from the IMod 120, via the dbsu signal, it notifies the output FIFO read controller 320 to transfer the data from the output FIFO memory 310 to the IMod. Data is transferred through the MUX 325 to the external debug bus 115, and finally, to the IMod.

6.3(b) Data Transfer to the Debug Port From the IMod—Inject Operation

As previously discussed, the IMod 120 is free to transmit data to the debug port any time that data is not being transferred to the IMod from the debug port. For illustrative purposes, consider the case where the IMod has a plurality of 32-bit words that it wants to place into the DJ0 605 register of the DJU 215. This constitutes a series of inject operations. (The debug port is injecting data/information into the signal processor.) For each inject operation, the IMod prepares a 16-bit header, followed by 32-bits of data, itself comprised of two 16-bit half-words. This 48-bit packet is then further divided into 8-bit bytes and sent on the external debug bus 115. As a matter of implementation, half-words are sent most significant byte followed by least significant byte.

When the IMod 120 wants to send data to the debug port 105 no advance notice is given that the packet will be sent; the IMod asserts the dbsu line as the first byte of each header is sent to indicate which half-words are headers and which are data. When the header and data bytes arrive at the move controller 335 they are assembled into 16-bit half-words and synchronized to the debug port's internal clock before being placed on the move controller bus 230. As the move controller 335 places each header on the move controller bus, it delineates the half-word to other units on the bus by asserting the header present output. When the DJU 215 detects that a header is present, it first decodes enough header bits to determine if the message is intended for the DJU. If it is, then the DJU decodes other header bits to determine the final destination for the data, i.e., which internal DJU register the data is targeted to. In this example, the code for DJ0 would be decoded, so the two half-words of data following the header will be loaded into register DJ0 605. When the DJU loads the last half-word of data into D J0, it also sets the D J0 available flag. The DJ0 available flag is one bit in the debug port's status register (described in Section 9), which the signal processor can read. If the signal processor's program is written so that the DJ0 available bit is monitored periodically when an inject operation is expected, then the program can determine when D J0 contains new data. When the signal processor reads the new data in DJ0, two events occur, 1) the djr0.sr service request is asserted causing a header to be sent to the IMod indicating that more data can be written into register DJ0, and 2) the DJ0 available flag is reset to indicate to the signal processor that new data is no longer available in the DJ0 register.

6.4 Debug Command Unit (DCU)

Figure 4:
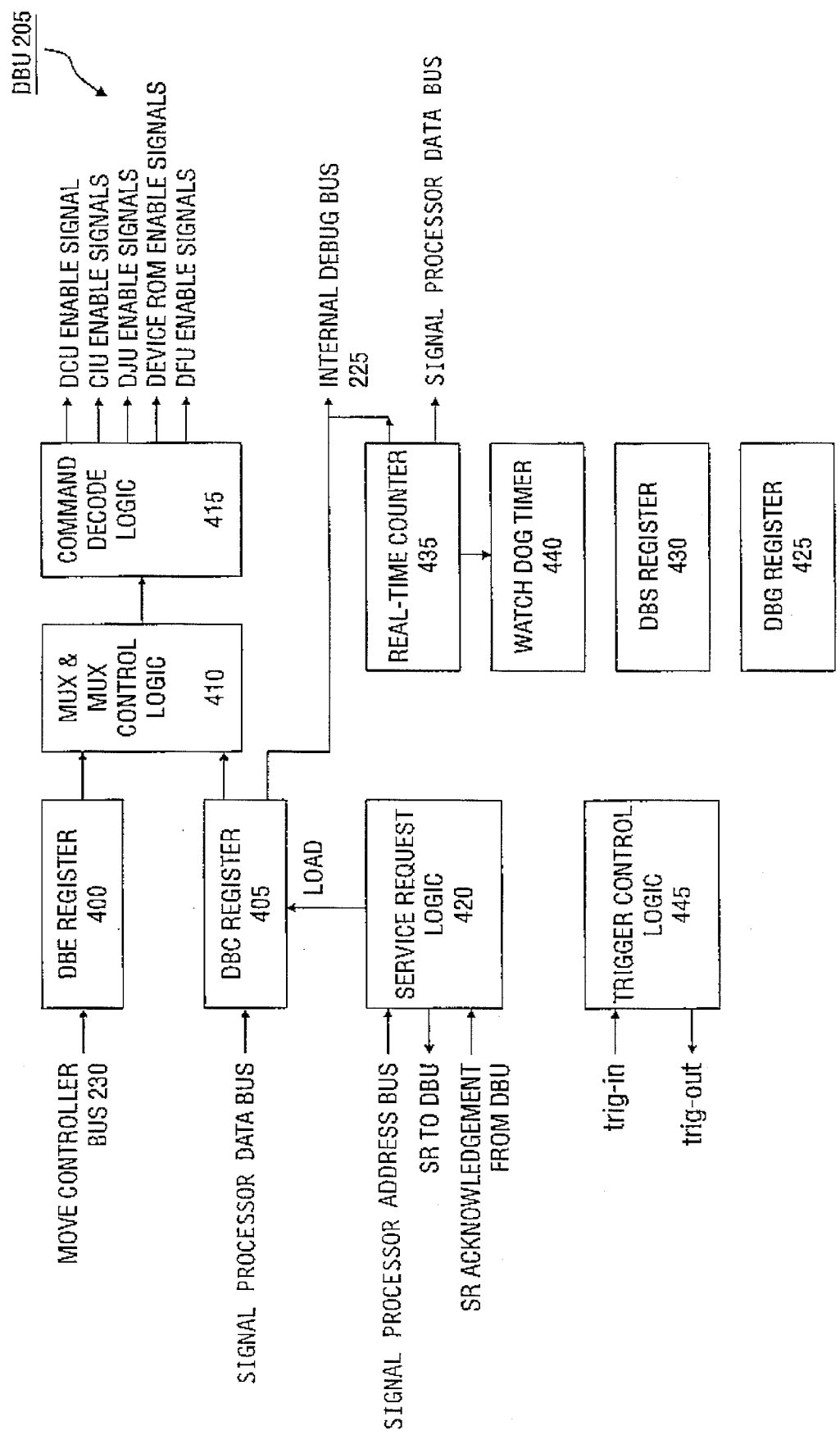
FIG. 4 is a block diagram of an on-chip debug circuit's command (DCU) unit in accordance with the invention.

As previously discussed, the debug command unit (DCU) 205 provides a means for decoding debug commands received from the IMod 120 or the signal processor 110. An expanded block diagram of the DCU is shown in FIG. 4, the elements of which are described below.

400 DBE Register. A register that receives header information, via the move controller bus 230, from the IMod 120. In one embodiment, the DBE register is 16 bits wide and can, therefore, be loaded with an entire header. In an alternative embodiment, the DBE register can be implemented to only copy those bits that are necessary for further DCU decoding. That is, the bits that remain after (1) the field specifying the number of data half-words following, and (2) the field specifying the DCU destination, have been stripped off.

405 DBC Register. A 32 bit double-buffered register that can be loaded with data from the signal processor data bus. The DBC register has two addresses associated with it. The first (high) address indicates that the data which has been loaded into the DBC register contains a header in its most significant half-word (16 bits). The second (low) address indicates that the data is strictly data, i.e. contains no header information.

If DBC contains header information, then a destination field within the header is decoded to determine if the destination for the header is the DCU itself. If it is, a part of the header that contains the command is routed to the DCU's decode logic 415. If the destination is not the DCU, then either the dbc 16 c.sr or dbc32 c.sr service request is asserted to transfer the header/data to the IMod 120. Service request dbc 16 c.sr is asserted if the field that specifies how many data half-words that follow is zero, indicating that the DBC contains only a header. Service request dbc32 c.sr is asserted if the field that specifies how many data half-words that follow is one, indicating that DBC contains a header and one half-word of data.

If the DBC contains only data, the dbc32 d.sr signal request is asserted indicating that the data is to be transferred to the IMod 120.

410 MUX and MUX Control Logic. Selects one of two possible debug command inputs for routing to the command decode logic 415 unit. The MUX data inputs, regardless of the source, consists of 9-bits of command data. The purpose of this circuitry is to select the source of a command to be decoded and executed. In other words, if the source is the DBE register, the DCU decodes and executes a command issued by the IMod 120. If the source is the DBC register, the DCU decodes and executes a command issued by the signal processor 110.

415 Command Decode Logic. Decodes incoming 9 bit commands into single output command signals. Eight general groups of signals are currently implemented: (1) DCU Enables, (2) Device ROM Enables, (3) DFU Enables, (4) DBU Commands, (5) DCU Commands, (6) DIU Commands, (7) DJU Commands, and (8) DFU Commands. Section 8 provides a description of these command/enable groups.

420 Service Request Logic. Decodes signal processor data bus addresses and generates DBC register 405 load signals for data directed to the DBU from the signal processor 110. If the signal processor directs data to the DBC register's 405 low address, then service request dbc 16 c.sr or dbc32 c.sr is asserted. If the signal processor directs data to the DBC register's high address, then service request dbc32 d.sr is asserted. Section 7.1 contains a listing of the other service requests generated by the DCU's service request logic, and their functions.

Service request acknowledgment signals are used to trigger a sequence of steps to effect the object of the original service request. For instance, assume the service request logic initially generates a dbc32 d.sr service request. When the dbc32 d.sr acknowledgment is received from the DBU 200, the DCU first waits until the DBU's header generator 305 has loaded the appropriate header into the output FIFO memory 310. The DCU then gates the least significant half-word (16 bits) of the DBC register onto the internal debug bus 225, and then the DBC register's most significant half-word. Half way through the transfer of the DBC register's most significant half-word, the dbc32 d.sr service request is de-asserted. A similar sequence is used in processing all service requests. All service request signals are held asserted until half way through the last data transfer operation. This unique design allows efficient processing of variable length messages/data. 425 DBG Register. A 16 bit setup and enable register which provides a latch mechanism for specified enable signals. Enable signals latched by this register include: (1) RTCE, (2) RSPBE, (3) RSPB, (4) SMME, (5) PROME, (6) DROME, (7) DFE, (8) NEXCE, (9) QEXCE, (10) DAE, and 3 bits reserved for future use. These enable signals are described in Section 8.

430 DBS Register. A collection of 32 status bits from throughout the debug port. Section 9 provides a concise listing of these bits and their function.

435 Real-Time Counter. A 32 bit counter that increments each debug port clock cycle. The contents of the real-time counter can be placed onto either the signal processor data bus or the internal debug bus 230. During debug operations, the real-time counter can be used to indicate the time at which debug data is captured by the debug port.

For example, signal processing programs are usually written so results are scaled after certain operations so that numeric or computational overflows do not occur. However, suppose at occasional random intervals, the program acts oddly and the programmer suspects that it is due to an overflow. To determine if this is the case, s/he can: (1) modify the program to enable overflow exceptions, (2) in an overflow exception routine, include an instruction that writes a header into the DBC register to cause the contents of the Real-Time Counter to be sent to the IMod, and (3) include other instructions that copy the contents of various registers or memory locations into the DBC register, so the data will be sent to the IMod 120 so s/he can determine why the overflow is occurring.

440 Watchdog Timer. A two bit (four state) counter which can be used to test for an infinite loop condition during program/task debug operations. State 0 indicates a clear or power-on condition. State 1 indicates that the real-time counter 435 has overflowed one time. State 2 indicates the real-time counter has overflowed twice. State 3 indicates the real-time counter has overflowed three times. If state 3 is reached it implies that the program being debugged could be in an infinite loop, that is, the program has not been able to reset the timer back to state 0. Reaching state 3 causes the signal processor 110 to be power-on reset.

445 Trigger Control Logic. Signal trig_in represents an external input to the debug port 105 indicating the occurrence of a specified external event. The trigger control logic records the occurrence of an edge (high to low or low to high transition) in the trig__ in signal and the level and makes this information available to the signal processor 110 and the IMed 120 via the DBS 430 register.

Signal trig__out is generated in response to a command from the decode logic 415. For example, a trig__out signal (pulse or level) can be generated each time a program under debug enters or leaves a specified routine, or completes execution of a loop (i.e., for-next loop). The trig__out signal is under direct control of the developer.

6.5 Debug Instruction Unit (DIU)

Figure 5:
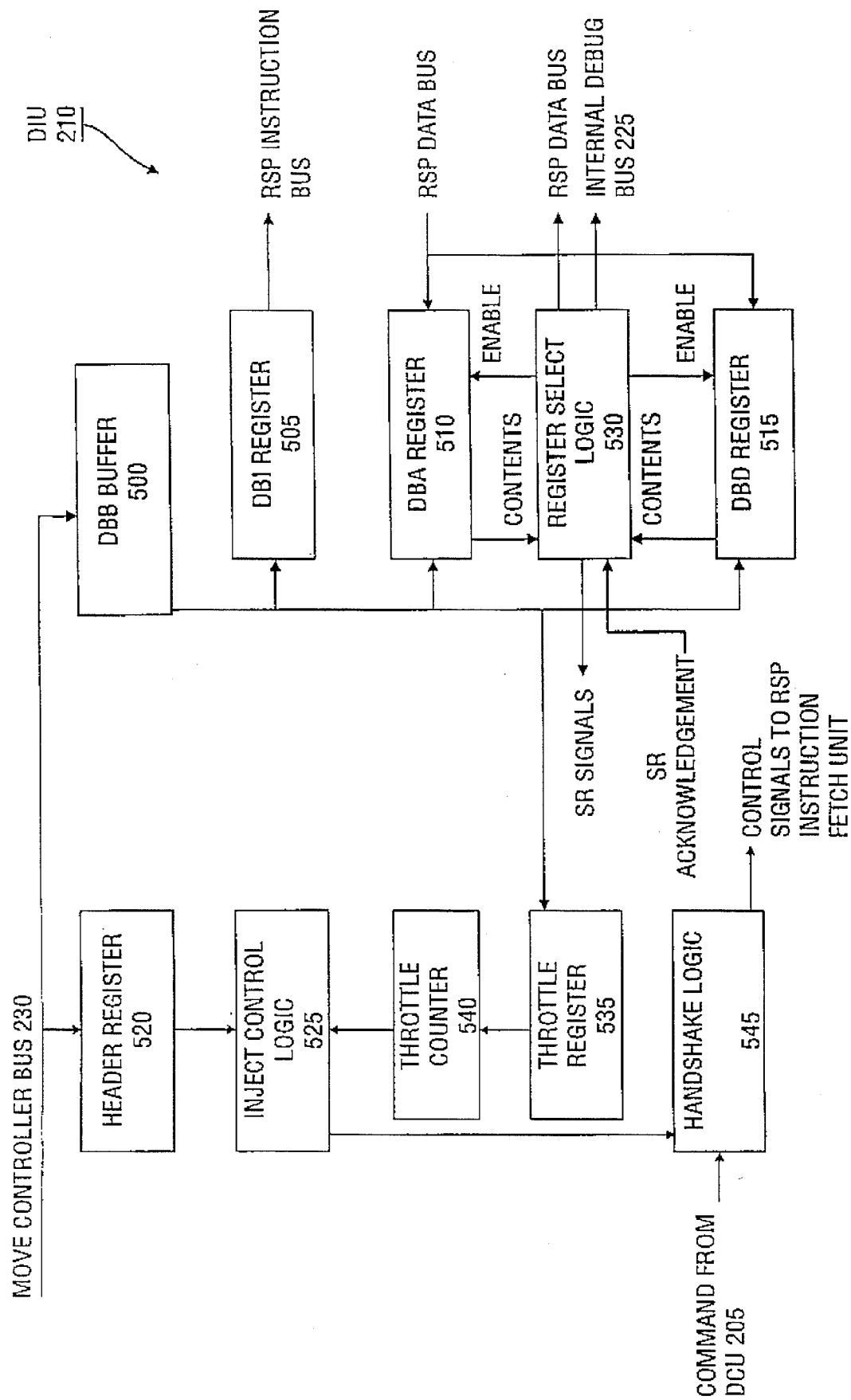
FIG. 5 is a block diagram of an on-chip debug circuit's instruction (DIU) unit in accordance with the invention.

As previously discussed, the debug instruction unit (DIU) 210 provides a means to insert an instruction with, or without, data into the instruction stream of the signal processor 110. While other types of instructions may be processed, types of instructions that are of primary interest include those that (1) move data between internal signal processor registers and memory and on-chip debug port registers or (2) alter signal processor program flow. An expanded view of the DIU is shown in FIG. 5, the elements of which are described below.

500 DBB Buffer. A 32 bit buffer loaded from the move controller bus 230 with data destined for the DBI 505, DBA 510, DBD 515, or Throttle 535 Register.

505 DBI Register. A 32 bit register which is loaded with the instruction that is to be injected into the signal processor 110. After the DIU meets inject criterion specified in the inject data header(s) and handshakes with the signal processor's instruction fetch unit, the contents of DBI are copied onto the signal processor's instruction bus.

510 DBA Register. A 24 bit register that can supply an address for use by the instruction injected into the signal processor 110 via DBI register 505. The contents of DBA are copied onto the signal processor's data bus. Eight bits of the DBA register are counter bits which can automatically decrement after each instruction injected, e.g. for transferring the contents of a block of memory to the workstation.

515 DBD Register. A 32 bit register used to transfer data into or out of the signal processor 110 using the signal processor's data bus. Data loaded into the DBD register from the signal processor causes assertion of either dbd0.sr or dbd1.sr service request signals which, in turn, causes the contents of the DBD register to be sent to the DBU 200. When data loaded into the DBD register is associated with an instruction which is to be injected into the signal processor instruction stream, it is gated onto the signal processor data bus under the control of the inject control logic unit 525. If the DBD register contains data not associated with an inject operation, the DBDA flag in the DBS register 430 is set to notify the signal processor that data is available and can be read at its will. See Section 9 for information regarding the DBS register.

520 Header Register. This 13 bit register is loaded from the move controller bus 230 with all of the header bits except for the 3 bits that specify the DIU as the destination for the packet. Of the thirteen bits in the header register, 2 bits are decoded to determine if the data in DBB 500 is to be loaded into the DBI register 505, the DBA register 510, the DBD register 515, or the Throttle register 535; 3 bits are decoded to determine if zero, one, or two data half-words were loaded into DBB (DBI is always loaded with 2 half-words, DBA & DBD are loaded with 1 or 2 half-words, and the Throttle register with 1 half-word; 0 half-words indicate the message consists of only the header); 1 bit either sets or resets a status bit that is added into headers by the DBU header generator 305 when DBD data is sent to the IMod; the remaining 7 bits are routed to the inject control logic 525.

525 Inject Control Logic. Decodes the 7 bits of the header which control instruction injection. Each of these bits have the following meaning:

1. Repeat bit. If 0, the instruction in the DBI register 505 is injected one time. If 1 the instruction in the DBI register 505 is injected repeatedly. (It is noted that "repeatedly" does not necessarily mean continuously.)
2. Throttle bit. If 0, the instruction in the DBI register 505 is injected independent of the throttle counter's 540 contents. If 1, the instruction in the DBI register is injected when the throttle counter reaches 0.
3. Available bit. If 0, the instruction in the DBI register 505 is injected immediately. If 1, the instruction in the DBI register is injected after the DBD register 515 is loaded, and the DBD available bit is set.
4. Trigger bit. If 0, the header register's 520 trigger code and the DCU's 205 decoded trigger signal are ignored. If 1, the instruction in the DBI register is injected when either occurs.
5. Decrement bit. If 0, the DBA register's 510 counting bits are not decremented after each injection operation. If 1, the DBA register's counting bits are decremented after each injection operation.
6. Quit bit. If 0, instruction injection is not terminated when the DBA register's 510 counting bits decrement to zero. If 1, instruction injection is terminated when the DBA register's 510 counting bits decrement to zero. This operation is only invoked if the repeat bit is set and the decrement bit is set.
7. Wait bit. If 0, any repeat operation in progress is terminated and the data in the DBB buffer 500 is loaded immediately into the register specified by the destination bits. If 1, data in the DBB buffer is held until any repeated operations are completed, after which the contents of the DBB buffer are loaded into the register specified by the destination bits.

530 Register Select Logic. Performs the following functions: (1) when the signal processor attempts to read either the DBA 510 or DBD 515 register, it copies the addressed register's contents onto the signal processor's data bus, (2) when the signal processor attempts to write either the DBA or DBD register, it copies the data on the signal processor's data bus into the addressed register, (3) when the DBD register is read or written, it sets one of the corresponding service requests listed in Section 7, (4) when a service request acknowledgment signal is received for transferring the contents of DBD to the output FIFO memory 310, it first waits until the header generator writes a header into the output FIFO memory and then copies the least significant half-word onto the internal debug bus 225, followed by the most significant half-word.

535 Throttle Register. A 16 bit register loaded from the least significant half-word of buffer DBB 500. Output from this register is loaded into the throttle counter 540.

540 Throttle Counter. A 16 bit count-down counter that outputs a throttle signal (pulse) to the inject control logic 525 indicating when to inject an instruction. Used in conjunction with the repeat and throttle control bits described above.

545 Handshake Logic. Used to implement a command handshaking interface between the DIU 210 and the signal processor's 110 instruction fetch unit to request the DIU be allowed to inject a single instruction into the signal processor's instruction stream.

In the instant invention, this element also implements an signal processor break operation by requesting and injecting a continuous sequence of NO-OP instructions into the signal processor instruction stream. This element also implements an signal processor single-step operation by momentarily leaving the break mode so that a single instruction is executed out of the device's program memory, before going back into the break mode. It will be understood by one of ordinary skill that the specifics of this logic depends entirely upon the signal processor design (or other onchip processor circuitry), but that such logic would be a logical and necessary part of any design.

6.6 Debug Inject/Extract Unit (DJU)

Figure 6:
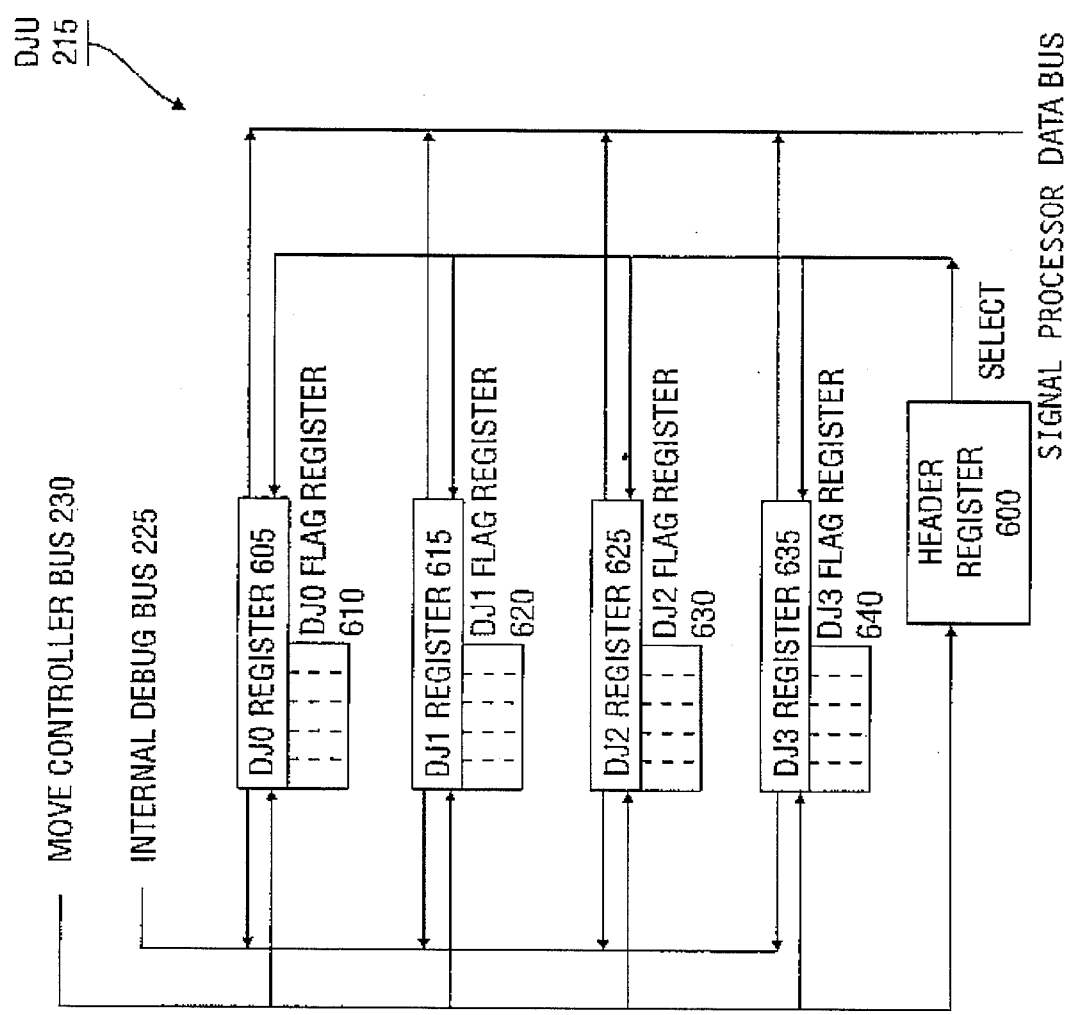
FIG. 6 is a block diagram of an on-chip debug circuit's inject/extract (DJU) unit in accordance with the invention.

As previously discussed, the debug inject/extract unit (DJU) 215 has three primary functions: (1) provides a means for injecting external sources of information, in real-time, into the signal processor 110 under program control, (2) extracts data generated by an executing program, in real-time, for transmission to the IMod 120 or debug workstation 125, and (3) supplies an executing program with data that would normally be provided via a routine. An expanded block diagram of the DJU is shown in FIG. 6, the elements of which are described below.

600 Header Register. Copies/loads header information intended for the DJU 215 from the move controller bus 230 and decodes it. Selects one of the DJU's internal registers, i.e., DJ0 through DJ3, to copy the data following the header.

605 DJ0 Register. A 32-bit register which can accept input from either the move controller bus 230 or an signal processor data bus. Output from the D J0 register can be routed to either the internal debug bus 225 or an signal processor data bus. In the current embodiment, both the move controller bus and internal debug bus are 16-bit buses. Thus, the DJ0 register is loaded from the move controller bus in two-steps, first, its least significant half-word (16 bits) is loaded, followed by its most significant half-word. Similarly, the DJ0 register's contents are copied onto the internal debug bus or signal processor data bus in two-steps; first, its least significant half-word (16 bits) is copied, followed by its most significant half-word. To start a DJ0 inject operation, either the signal processor 110 can initiate the process by reading from the DJ0 register; or alternatively, the IMod 120 can initiate the process by writing the first word of data into the DJ0 register. If the signal processor initiates the process, the first word read will be meaningless and should be discarded. }

To start a DJ0 extract operation, the signal processor always initiates the process by writing data into the DJ0 register. The extract data is transferred out of the DJU 215 via the internal debug bus 225.}

610 DJ0 Flag Register. An ancillary register to the DJ0 register comprised of five bits implementing service requests: djr0.sr, djs0.sr, djf0.sr, and djow0.sr (see Section 7 for details on these service request signals), and the DJ0 filled flag DJF0 (the DJF0 filled flag is read as part of the debug port's status register DBS, see Section 9 for details on this flag). Functionally, the DJ0 flag register implements an automatic hand-shaking protocol between register DJ0 and DBU 200 during data transfer operations.

615 DJ1 Register. Functionally equivalent to the DJ0 register 605.

620 DJ1 Flag Register. Functionally equivalent to the DJ0 flag register 610.

625 DJ2 Register. Functionally equivalent to the DJ0 register 605.

630 DJ2 Flag Register. Functionally equivalent to the DJ0 flag register 610.

635 DJ3 Register. Functionally equivalent to the DJ0 register 605.

640 DJ3 Flag Register. Functionally equivalent to the DJ0 flag register 610.

6.7 Debug Flow Unit (DFU)

A debug flow unit in accordance with the invention is described in co-pending U.S. patent. application, Ser. No. 08/155,891.

6.8 Some Advantages of the Invention

1. A debug port in accordance with the invention is responsive to the signal processor's run time state, allowing the detection of intermittent problems.

2. A debug port in accordance with the invention is specifically designed to allow the real-time debugging of software/hardware. That is, program development information is collected without interrupting the execution of the on-chip processor. Additionally, the debug port implements standard break-point and single-step debugging methods.

3. The DBU unit 200 communicates with its companion external interface module (IMod 120) asynchronously. This feature allows the on-chip (VLSI) device to run faster and faster as process (semiconductor) technology advances occur, without requiring the IMod to match the processor's speed advances.

4. The DCU 205 allows interactive debugging of signal processor applications, i.e., programs executing on the on-chip processor 110. Specifically, the DCU provides a means (the DBC register 405) by which an application program can indicate which routine it is currently executing which, in turn, allows the IMod 120 to send back debug commands particular to that code segment.

5. Unique to the inventive debug port is its ability to accept commands from the program under test, i.e., the program executing on the on-chip processor or signal processor 110. In particular, the signal processor application can cause the DCU's real-time counter 435 to be transmitted to the IMod 120. This feature can be used to time-stamp debug information transferred from the signal processor to the IMod.

6. The DIU 210 permits a user to retrieve results on on-chip computations without having to add special debug instructions—and re-assembling or recompiling—their program whenever they determine a new variable needs to be examined.

7. The DIU 210 permits capture of seldom occurring events so that they can be replayed over and over again until an understanding of the problem is gained.

8. The DIU 210 permits easy input of data from simulated events during program development.

7. DEBUG PORT SERVICE REQUESTS

The following list identifies the 35 service requests (SRs) accepted by the DBU's 200 service request arbitrator 300 unit. Each SR is binary in nature, it is either asserted or not asserted.

7.1 Service Requests From The Debug Control Unit (DCU)

| SR Name | Function |
| --- | --- |
| dbc16c.sr | Requests transfer of a header from the most significant 16 bits of the DBC 405 register. This request does not cause the DBU's 200 header generator 305 to generate a message header. |
| dbc32c.sr | Requests transfer of a header from the most significant 16 bits of the DBC 405 register, followed by transfer of data from the least significant 16 bits of the DBC register. This request does not cause the DBU's 200 header generator 305 to generate a message header. |
| dbc32d.sr | Requests transfer of 32 bits of data from the DBC 405 register. |

-continued

| SR Name | Function |
|---|---|
| dbg.sr | Requests transfer of 16 bits of data from the DBG 425 register. |
| dbs.sr | Requests transfer of 32 bits of status data from the DBS 430 register. |
| rtcc.sr | Requests transfer of the real-time counter's 435 contents (32 bits). |
| rtcv.sr | Requests that the header generator 305, generate and place a header into the output FIFO memory 310, indicating that the real-time counter 435 has reached zero. |
| wdt.sr | Requests that the header generator 305 generate and place a header into the output FIFO memory 310 indicating that the watchdog timer 440 has expired. |

7.2 Service Requests From The Debug Instruction Unit (DIU)

| SR Name | Function |
|---|---|
| dbd0.sr | Indicates that the signal processor has written data into the DBD 515 register using the lower of the DBD register's two addresses. (A slightly different header is generated for this message versus the header generated for the message sent via dbd1.sr) |
| dbd1.sr | Indicates that the signal processor has written data into the DBD 515 register using the higher of the DBD register's two addresses. (A slightly different header is generated for this message versus the header generated for the message sent via dbd0.sr). |
| dbdj.sr | Indicates that the signal processor has read the DBD 515 register's contents and that the IMOD 120 can load new data into the DBD register. |
| diow.sr | Indicates that an attempted overwrite of the DBD 515 register occurred before its previous contents were read. |

7.3 Service Requests From The Debug Inject/Extract Unit (DJU)

| SR Name | Function |
|---|---|
| djs0.sr | Indicates that the signal processor 110 has written data into register DJ0 605. |
| djs1.sr | Indicates that the signal processor 110 has written data into register DJ1 615. |
| djs2.sr | Indicates that the signal processor 110 has written data into register DJ2 625. |
| djs3.sr | Indicates that the signal processor 110 has written data into register DJ3 635. |
| djr0.sr | Indicates that the signal processor 110 has read the data currently in register DJ0 605 and is ready for new data. |
| djr1.sr | Indicates that the signal processor 110 has read the data currently in register DJ1 615 and is ready for new data. |
| djr2.sr | Indicates that the signal processor 110 has read the data currently in register DJ2 625 and is ready for new data. |
| djr3.sr | Indicates that the signal processor 110 has read the data currently in register DJ3 635 and is ready for new data. |
| djow0.sr | Indicates that an attempt to overwrite the DJ0 605 register occurred (by either the signal processor 110 or or DBU 200) before its previous contents were read. |
| djow1.sr | Indicates that an attempt to overwrite the DJ1 615 register occurred (by either the signal processor 110 or DBU 200) before its previous contents were read. |
| djow2.sr | Indicates that an attempt to overwrite the DJ2 625 register occurred (by either the signal processor 110 or DBU 200) before its previous contents were read. |
| djow3.sr | Indicates that an attempt to overwrite the DJ3 635 register occurred (by either the signal processor 110 or DBU 200) before its previous contents were read. |

7.4 Service Requests From The Debug Program Flow Unit (DFU)

Specific architectural details of the DFU can be found in co-pending U.S. patent application Ser. No. 08/155,891.

| SR Name | Function |
|---|---|
| df16.sr | Requests transfer of data from three different DFU 220 registers. One register transfers only 16 bits of data. |
| df32.sr | Requests transfer of data from three different DFU 220 registers. All three registers transfer 32 bits of data. |

8. DEBUG COMMAND UNIT COMMANDS AND ENABLES

The debug command unit (DCU) 205 decodes commands from the IMod 120 and the signal processor 110. Some of the decoded commands are used to set or reset flip-flops whose outputs are used as enables. Other commands are output directly as positive or negative pulses for only one clock period. The tables that follow describe the enable and command signals generated by the DCU's command decode logic 415, and indicate their intended destination.

8.1 Debug Command Unit (DCU) Enables

| Name | Function |
|---|---|
| RTCE | Enables the Real-Time Counter 435. |
| RSPBE | Causes the signal processor 110 to enter break mode when the DBU's output FIFO 310 is full. |
| RSPB | Causes signal processor 110 to enter break mode. |

8.2 Device ROM Enables

| Name | Function |
|---|---|
| PROME | Enables the signal processor 110 internal program read-only memory (ROM). |
| DROME | Enables the signal processor 110 internal data ROM. |

8.3 Debug Flow Unit (DFU) Enables

Specific architectural details of a DFU 220 can be found in co-pending U.S. patent application Ser. No. 08/155.891.

| Name | Function |
|---|---|
| DFE | Enables the DFU 220 |
| NEXCE | Enables DFU 220 capture for normal exceptions. (Not shown in U.S. Pat. application No. 08/155,891.) |
| QEXCE | Enables DFU 220 capture for quick exceptions. (Not shown in U.S. Pat. application No. 08/155,891.) |
| SMME | Enables 16 bit transfers from an internal DFU register to the output FIFO memory 310, instead of 32-bits. (Not shown in U.S. Pat. application No. 08/155,891.) |

8.4 Debug Bus Unit (DBU) Commands

| Name | Function |
|---|---|
| clr_dbq | Clear output FIFO memory 310. |

8.5 Debug Command Unit (DCU) Commands

| Name | Function |
|---|---|
| set_dbg_sr | Set (assert) service request dbg.sr. |
| set_dbs_sr | Set (assert) service request dbs.sr. |
| set_rtcc_sr | Set (assert) service request to cause the contents of the real-time counter 435 to |

| Name | Function |
|---|---|
| | be copied to the output FIFO memory 310. |
| reset_xedge | Reset trig_in 'edge detected' flip-flop. |
| set_trig_out | Set (assert) output trig_out. |
| reset_trig_out | Reset output trig_out. |
| tog_trig_out | Toggle state of trig_out. |
| pulse_trig_out+ | Output positive pulse on trig_out. |
| pulse_trig_out− | Output negative pulse on trig_out. |
| pulse_trig_out | Output pulse on trig_out. |
| req_dbint | Request debug port exception. |
| tog_F0 | Toggle user flag F0. (See Section 9.) |
| set_F0 | Set (assert) user flag F0. (See Section 9.) |
| reset_F0 | Reset user flag F0. (See Section 9.) |
| tog_F1 | Toggle user flag F1. (See Section 9.) |
| set_F1 | Set (assert) user flag F1. (See Section 9.) |
| reset_F1 | Reset user flag F1. (See Section 9.) |
| dis_wdt | Disable watchdog timer 440. |
| strt_wdt | Start watchdog timer 440. |
| adv_wdt | Advance watchdog timer 440. |
| fail_wdt | Fail watchdog timer 440 |
| reset_rtc | Reset real-time counter 435. |
| por_rsp | Power-on reset signal processor 110. |
| run_rsp | Set (assert) signal processor 110 to run mode. |

8.6 Debug Instruction Unit (DIU) Commands

| Name | Function |
|---|---|
| set_reset_dbda | Set/reset DBD 515 available flag. |
| trig_inst_inj | Trigger instruction injection. |
| clear_dbb | Set DBB 500 available flag. |
| dbim_stop | Set trigger, repeat, decrement, and run bits in the inject control logic 525 to zero. |
| brk_rsp | Put signal processor 110 into break mode. |
| ss_rsp | Single-step signal processor 110. |

8.7 Debug Inject/Extract Unit (DJU) Commands

| Name | Function |
|---|---|
| set_reset_djf0 | Set/reset DJ0 600 filled flag. |
| set_reset_djf1 | Set/reset DJ1 615 filled flag. |
| set_reset_djf2 | Set/reset DJ2 625 filled flag. |
| set_reset_djf3 | Set/reset DJ3 635 filled flag. |

8.8 Debug Flow Unit (DFU) Commands

| Name | Function |
|---|---|
| set_dfxx_sr | Causes program address capture and sets df16.sr or df32.sr. |
| reset_dfr | Reset DFU reference counter (a DFU counter that gets incremented whenever program flow data is copied into the output FIFO memory 310. |

9. DEBUG STATUS (DBS) REGISTER FORMAT

| Name | Bits | Function |
|---|---|---|
| User Flags F0, F1 | 2 | User definable status bits accessible to either the signal processor 110 or the IMod 120. |
| Watchdog State WD0, WD1 | 2 | Indicates which of 4 states the watchdog timer 440 is currently in. |
| External Trigger In TRIG_IN, TRIG_EDGE | 2 | TRIG_IN indicates if the signal on the trig_in input is high or low. TRIG_EDGE indicates if an edge is detected in the signal on the trig_in input. |
| External Trigger Out X0 | 1 | Controls the state of the DCU's TRIG_OUT signal. |
| Output FIFO status DBQA,DBQE | 2 | DBQA is true when the DBU output FIFO memory 310 is available. DBQE is true when the DBU output FIFO memory is empty. |
| DIU Exec Mode DBIM0→5 | 6 | Used to request that the signal processor 110 execute an instruction provided from the IMod 120 via the DIU's DBI register 505 and to control decrementing of the DIU's DBA register 510. |
| DBA Counter DBAZ | 1 | True when the 8-bit DBA 510 counter field equals zero. |
| DBB Available DBBA | 1 | True when the DBB buffer 500 is available. |
| DBC Available DBCA | 1 | Indicates when the DBC 405 register is available to accept new command or data information. |
| DBD Filled Flag DBDF | 1 | Indicates when the DIU's DBD 515 register contains data for or from the signal processor 110. |
| DJU Filled Flags DJF0→7 | 8 | Indicate when the DJU 215 registers contain inject data for the signal processor 110 or extract data from the signal processor. In a current embodiment only 4 bits are used. |
| Debug Exception Request DBEXC | 1 | Used to request an signal processor 110 exception using the debug port exception vector. (See DCU command req_dbint in Section 8.5 above.) |
| Signal Processor Execution Mode RSP0,RSP1 | 2 | Indicate one of four signal processor 110 modes: (1) run, (2) Wait, (3) Break, or (4) Halt. |

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application program.

What is claimed is:

1. An on-chip debug system for a programmable VLSI processor, said on-chip debug system referred to as a debug port, said debug port comprising:

(a) a plurality of units, said units including (1) a debug bus unit, (2) a debug command unit, (3) a debug instruction unit, (4) a debug inject/extract unit, and (5) a program flow unit;

(b) a first internal bus referred to as the internal debug bus;

(c) a second internal bus referred to as the move controller bus;

(d) said debug bus unit being operatively coupled (i) to receive debug information from at least one other of said plurality of units via the internal debug bus and (ii) to send debug information to at least one other of said plurality of units via the move controller bus, said debug bus unit having (1) means for sending signals to and receiving signals from an external interface module at an external interface data exchange rate, (2) means for receiving a service-request signal from at least one other of said plurality of units and for arbitrating and acknowledging said service-request signal, (3) means for storing debug information received from at least one other of said plurality of units, and (4) means for synchronizing the external interface data exchange rate and an internal debug port data exchange rate;

(e) said debug command unit operatively coupled (i) to receive a debug command from at least one other of said plurality of units via the move controller bus, said debug command unit having
(1) means for receiving a debug command from the VLSI processor,
(2) means for selecting and decoding a debug command,
(3) a status latch register for selectively latching one or more status signals received from at least one of said plurality of units,
(4) means for sending said one or more selectively latched status signals to at least one of said plurality of units,
(5) an enable latch register for selectively latching one or more enable signals received from at least one of said plurality of units,
(6) means for sending said one or more selectively latched enable signals to at least one other of said plurality of units,
(7) a timer,
(8) means for sending timer information to the VLSI processor,
(9) means for sending timer information to at least one other of said plurality of units via the internal debug bus,
(10) means for sending debug information to at least one other of said plurality of units via the internal debug bus,
(11) means for sending a service-request signal to the debug bus unit, and
(12) means for receiving a service-request acknowledgment signal from the debug bus unit;

(f) said debug instruction unit being operatively coupled
(i) to receive debug information from at least one other of said plurality of units via the move controller bus and
(ii) to send debug information to at least one other of said plurality of units via the internal debug bus, said debug instruction unit having
(1) means for sending a VLSI instruction to a first register internal to the VLSI processor,
(2) means for sending VLSI data associated with said VLSI instruction to a second register internal to the VLSI processor,
(3) means for receiving data from one or more registers internal to said VLSI processor,
(4) means for sending a service-request signal to the debug bus unit, and
(5) means for receiving a service-request acknowledgment signal from the debug bus unit;

(g) said debug inject/extract unit being operatively coupled to (i) receive debug information from at least one other of said plurality of units via the move controller bus and (ii) send debug information to at least one other of said plurality of units via the internal debug bus, said debug inject/extract unit having
(1) means for sending data to a register internal to the VLSI processor,
(2) means for receiving data from a register internal to the VLSI processor,
(3) means for sending a service-request signal to the debug bus unit, and
(4) means for receiving a service-request acknowledgment signal from the debug bus unit; and (h) said program flow unit configured to monitor a task being executed by the VLSI processor, said task having a branch execution behavior, said program flow unit being operatively coupled to send debug information to at least one other of said plurality of units via the internal debug bus, said program flow unit having
(1) means for monitoring said branch execution behavior,
(2) means for reporting said branch execution behavior to the debug bus unit,
(3) means for sending a service-request signal to the debug bus unit, and
(4) means for receiving a service-request acknowledgment signal from the debug bus unit.

2. An on-chip debug system, having a plurality of units, for a programmable VLSI processor, said on-chip debug system referred to as a debug port, comprising:

(a) a first internal bus referred to as the internal debug bus;

(b) a second internal bus referred to as the move controller bus;

(c) a debug bus unit for exchanging information between the debug port and an external interface module, said debug bus unit operatively coupled (1) to receive debug information from at least one of said plurality of units via the internal debug bus and (2) to send debug information to at least one of said plurality of units via the move controller bus;

(d) a debug command unit for decoding and executing a debug command, said debug command unit operatively coupled (1) to receive a debug command from at least one of said plurality of units via the move controller bus, (2) to receive a debug command from the VLSI processor, (3) to selectively send debug status and timer information to at least one of said plurality of units via the internal debug bus, and (4) to selectively send a debug port enable signal to at least one of said plurality of units;

(e) a debug instruction unit for sending a VLSI instruction to a first register internal to the VLSI processor and for sending VLSI instruction-data, associated with the VLSI instruction, to a second register internal to the VLSI processor, and for receiving debug data from one or more registers internal to the VLSI processor, said debug instruction unit operatively coupled (1) to receive debug information from at least one of said plurality of units via the move controller bus and (2) to send debug information to at least one of said plurality of units via the internal debug bus;

(f) a debug inject/extract unit for sending task-data to a task being executed by the VLSI processor and for receiving task-data generated by the task, said debug inject/extract unit operatively coupled (1) to receive debug information from at least one of said plurality of units via the move controller bus and (2) to send debug information to at least one of said plurality of units via the internal debug bus; and (g) a program flow unit for monitoring a task being executed by the VLSI processor, said task having a branch execution behavior, said program flow unit operatively coupled to send debug information to at least one of said plurality of units via the internal debug bus.

3. The on-chip debug system for a programmable VLSI processor of claims 1 or 2, wherein said status signals encode information representative of one or more of (1) state of a user flag, (2) availability of a temporary memory within the debug bus unit, (3) state of a watchdog counter, (4) filled status of register memory internal to the debug inject/extract unit, (5) filled status of register memory internal to the debug instruction unit, (6) filled status of register memory internal to the debug command unit, and (7) operational mode of the VLSI processor.

4. The on-chip debug system for a programmable VLSI processor of claims 1 or 2, wherein said enable signals encode information to enable and disable the operation of one or more of: a realtime counter and the debug flow unit.

5. The on-chip debug bus unit for a VLSI processor of claims 1 or 2, wherein said service-request signal is selected from the group consisting of dbc16c.sr, dbc32c.sr, dbc32d.sr, dbg.sr, dbs.sr, rtcc.sr, rtcv.sr, wdt.sr, dbd0.sr, dbd1.sr, dbdj.sr, diow.sr, djs0.sr, djs1.sr, djs2.sr, djs3.sr, djr0.sr, djr1.sr, djr2.sr, djr3.sr, djow0.sr, djow1.sr, djow2.sr, djow3.sr, df16.sr, df32.sr.

6. An on-chip debug system for a programmable VLSI processor, said on-chip debug system referred to as a debug port, said debug port comprising:

(a) a plurality of units, said units including (1) a debug bus unit, (2) a debug command unit, (3) a debug instruction unit, and (4) a debug inject/extract unit;

(b) a first internal bus referred to as the internal debug bus;

(c) a second internal bus referred to as the move controller bus;

(d) said debug bus unit being operatively coupled (i) to receive debug information from at least one other of said plurality of units via the internal debug bus and (ii) to send debug information to at least one other of said plurality of units via the move controller bus, said debug bus unit having
  (1) means for sending signals to and receiving signals from an external interface module at an external interface data exchange rate,
  (2) means for receiving a service-request signal from at least one other of said plurality of units and for arbitrating and acknowledging said service-request signal,
  (3) means for storing debug information received from at least one other of said plurality of units, and
  (4) means for synchronizing the external interface data exchange rate and an internal debug port data exchange rate;

(e) said debug command unit operatively coupled (i) to receive a debug command from at least one other of said plurality of units via the move controller bus, said debug command unit having
  (1) means for receiving a debug command from the VLSI processor,
  (2) means for selecting and decoding a debug command,
  (3) a status latch register for selectively latching one or more status signals received from at least one of said plurality of units,
  (4) means for sending said one or more selectively latched status signals to at least one of said plurality of units,
  (5) an enable latch register for selectively latching one or more enable signals received from at least one of said plurality of units,
  (6) means for sending said one or more selectively latched enable signals to at least one other of said plurality of units,
  (7) a timer,
  (8) means for sending timer information to the VLSI processor,
  (9) means for sending timer information to at least one other of said plurality of units via the internal debug bus,
  (10) means for sending debug information to at least one other of said plurality of units via the internal debug bus,
  (11) means for sending a service-request signal to the debug bus unit, and
  (12) means for receiving a service-request acknowledgment signal from the debug bus unit;

(f) said debug instruction unit being operatively coupled (i) to receive debug information from at least one other of said plurality of units via the move controller bus and (ii) to send debug information to at least one other of said plurality of units via the internal debug bus, said debug instruction unit having
  (1) means for sending a VLSI instruction to a first register internal to the VLSI processor,
  (2) means for sending VLSI data associated with said VLSI instruction to a second register internal to the VLSI processor,
  (3) means for receiving data from one or more registers internal to said VLSI processor,
  (4) means for sending a service-request signal to the debug bus unit, and
  (5) means for receiving a service-request acknowledgment signal from the debug bus unit; and (g) said debug inject/extract unit being operatively coupled to (i) receive debug information from at least one other of said plurality of units via the move controller bus and (ii) send debug information to at least one other of said plurality of units via the internal debug bus, said debug inject/extract unit having
  (1) means for sending data to a register internal to the VLSI processor,
  (2) means for receiving data from a register internal to the VLSI processor,
  (3) means for sending a service-request signal to the debug bus unit, and
  (4) means for receiving a service-request acknowledgment signal from the debug bus unit.

7. An on-chip debug system, having a plurality of units, for a programmable VLSI processor, said on-chip debug system referred to as a debug port, comprising:

(a) a first internal bus referred to as the internal debug bus;

(b) a second internal bus referred to as the move controller bus;

(c) a debug bus unit for exchanging information between the debug port and an external interface module, said debug bus unit operatively coupled (1) to receive debug information from at least one of said plurality of units via the internal debug bus and (2) to send debug information to at least one of said plurality of units via the move controller bus;

(d) a debug command unit for decoding and executing a debug command, said debug command unit operatively coupled (1) to receive a debug command from at least one of said plurality of units via the move controller bus, (2) to receive a debug command from the VLSI processor, (3) to selectively send debug status and timer information to at least one of said plurality of units via the internal debug bus, and (4) to selectively send a debug port enable signal to at least one of said plurality of units;

(e) a debug instruction unit for sending a VLSI instruction to a first register internal to the VLSI processor and for sending VLSI instruction-data, associated with the VLSI instruction, to a second register internal to the VLSI processor, and for receiving debug data from one or more registers internal to the VLSI processor, said debug instruction unit operatively coupled (1) to receive debug information from at least one of said plurality of units via the move controller bus and (2) to send debug information to at least one of said plurality of units via the internal debug bus; and (f) a debug inject/extract unit for sending task-data to a task being executed by the VLSI processor and for receiving task-data generated by the task, said debug inject/extract unit operatively coupled (1) to receive debug information from at least one of said plurality of units via the move controller bus and (2) to send debug information to at least one of said plurality of units via the internal debug bus.

8. The on-chip debug system for a programmable VLSI processor of claims 6 or 7, wherein said status signals encode information representative of one or more of (1) state of a user flag, (2) availability of a temporary memory within the debug bus unit, (3) state of a watchdog counter, (4) filled status of register memory internal to the debug inject/extract unit, (5) filled status of register memory internal to the debug instruction unit, (6) filled status of register memory internal to the debug command unit, and (7) operational mode of the VLSI processor.

9. The on-chip debug system for a programmable VLSI processor of claims 6 or 7, wherein said enable signals encode information to enable and disable the operation a real-time counter.

10. The on-chip debug bus unit for a VLSI processor of claims 6 or 7, wherein said service-request signal is selected from the group consisting of dbc16c.sr, dbc32c.sr, dbc32d.sr, dbg.sr, dbs.sr, rtcc.sr, rtcv.sr, wdt.sr, dbd0.sr, dbd1.sr, dbdj.sr, diow.sr, djs0.sr, djs1.sr, djs2.sr, djs3.sr, djr0.sr, djr1.sr, djr2.sr, djr3.sr, djow0.sr, djow1.sr, djow2.sr, and djow3.sr.

11. An on-chip debug system for a programmable VLSI processor, said on-chip debug system referred to as a debug port, said debug port comprising:

(a) a plurality of units, said units including (1) a debug bus unit, (2) a debug command unit, and (3) a debug instruction unit;

(b) a first internal bus referred to as the internal debug bus;

(c) a second internal bus referred to as the move controller bus;

(d) said debug bus unit being operatively coupled (i) to receive debug information from at least one other of said plurality of units via the internal debug bus and (ii) to send debug information to at least one other of said plurality of units via the move controller bus, said debug bus unit having (1) means for sending signals to and receiving signals from an external interface module at an external interface data exchange rate, (2) means for receiving a service-request signal from at least one other of said plurality of units and for arbitrating and acknowledging said service-request signal, (3) means for storing debug information received from at least one other of said plurality of units, and (4) means for synchronizing the external interface data exchange rate and an internal debug port data exchange rate;

(e) said debug command unit operatively coupled (i) to receive a debug command from at least one other of said plurality of units via the move controller bus, said debug command unit having (1) means for receiving a debug command from the VLSI processor, (2) means for selecting and decoding a debug command, (3) a status latch register for selectively latching one or more status signals received from at least one of said plurality of units, (4) means for sending said one or more selectively latched status signals to at least one of said plurality of units, (5) an enable latch register for selectively latching one or more enable signals received from at least one of said plurality of units, (6) means for sending said one or more selectively latched enable signals to at least one other of said plurality of units, (7) a timer, (8) means for sending timer information to the VLSI processor, (9) means for sending timer information to at least one other of said plurality of units via the internal debug bus,

(10) means for sending debug information to at least one other of said plurality of units via the internal debug bus,

(11) means for sending a service-request signal to the debug bus unit, and

(12) means for receiving a service-request acknowledgment signal from the debug bus unit; and (f) said debug instruction unit being operatively coupled (i) to receive debug information from at least one other of said plurality of units via the move controller bus and (ii) to send debug information to at least one other of said plurality of units via the internal debug bus, said debug instruction unit having (1) means for sending a VLSI instruction to a first register internal to the VLSI processor, (2) means for sending VLSI data associated with said VLSI instruction to a second register internal to the VLSI processor, (3) means for receiving data from one or more registers internal to said VLSI processor, (4) means for sending a service-request signal to the debug bus unit, and (5) means for receiving a service-request acknowledgment signal from the debug bus unit.

12. An on-chip debug system, having a plurality of units, for a programmable VLSI processor, said on-chip debug system referred to as a debug port, comprising:

(a) a first internal bus referred to as the internal debug bus;

(b) a second internal bus referred to as the move controller bus;

(c) a debug bus unit for exchanging information between the debug port and an external interface module, said debug bus unit operatively coupled (1) to receive debug information from at least one of said plurality of units via the internal debug bus and (2) to send debug information to at least one of said plurality of units via the move controller bus;

(d) a debug command unit for decoding and executing a debug command, said debug command unit operatively coupled (1) to receive a debug command from at least one of said plurality of units via the move controller bus, (2) to receive a debug command from the VLSI processor, (3) to selectively send debug status and timer information to at least one of said plurality of units via the internal debug bus, and (4) to selectively send a debug port enable signal to at least one of said plurality of units; and (e) a debug instruction unit for sending a VLSI instruction to a first register internal to the VLSI processor and for sending VLSI instruction-data, associated with the VLSI instruction, to a second register internal to the VLSI processor, and for receiving debug data from one or more registers internal to the VLSI processor, said debug instruction unit operatively coupled (1) to receive debug information from at least one of said plurality of units via the move controller bus and (2) to send debug information to at least one of said plurality of units via the internal debug bus.

13. The on-chip debug system for a programmable VLSI processor of claims 11 or 12, wherein said status signals encode information representative of one or more of (1) state of a user flag, (2) availability of a temporary memory within the debug bus unit, (3) state of a watchdog counter, (4) filled status of register memory internal to the debug inject/extract unit, (5) filled status of register memory internal to the debug instruction unit, (6) filled status of register memory internal to the debug command unit, and (7) operational mode of the VLSI processor.

14. The on-chip debug system for a programmable VLSI processor of claims 11 or 12, wherein said enable signals encode information to enable and disable the operation a real-time counter.

15. The on-chip debug bus unit for a VLSI processor of claims 11 or 12, wherein said service-request signal is selected from the group consisting of dbc16c.sr, dbc32c.sr, dbc32d.sr, dbg.sr, dbs.sr, rtcc.sr, rtcv.sr, wdt.sr, dbd0.sr, dbd1.sr, dbdj.sr, and diow.sr.

16. An on-chip debug system for a programmable VLSI processor, said on-chip debug system referred to as a debug port, said debug port comprising:

(a) a plurality of units, said units including (1) a debug bus unit, (2) a debug command unit, and (3) a debug inject/extract unit;

(b) a first internal bus referred to as the internal debug bus;

(c) a second internal bus referred to as the move controller bus;

(d) said debug bus unit being operatively coupled (i) to receive debug information from at least one other of said plurality of units via the internal debug bus and (ii) to send debug information to at least one other of said plurality of units via the move controller bus, said debug bus unit having (1) means for sending signals to and receiving signals from an external interface module at an external interface data exchange rate, (2) means for receiving a service-request signal from at least one other of said plurality of units and for arbitrating and acknowledging said service-request signal, (3) means for storing debug information received from at least one other of said plurality of units, and (4) means for synchronizing the external interface data exchange rate and an internal debug port data exchange rate;

(e) said debug command unit operatively coupled (i) to receive a debug command from at least one other of said plurality of units via the move controller bus, said debug command unit having (1) means for receiving a debug command from the VLSI processor, (2) means for selecting and decoding a debug command, (3) a status latch register for selectively latching one or more status signals received from at least one of said plurality of units, (4) means for sending said one or more selectively latched status signals to at least one of said plurality of units, (5) an enable latch register for selectively latching one or more enable signals received from at least one of said plurality of units, (6) means for sending said one or more selectively latched enable signals to at least one other of said plurality of units, (7) a timer, (8) means for sending timer information to the VLSI processor, (9) means for sending timer information to at least one other of said plurality of units via the internal debug bus,

(10) means for sending debug information to at least one other of said plurality of units via the internal debug bus,

(11) means for sending a service-request signal to the debug bus unit, and

(12) means for receiving a service-request acknowledgment signal from the debug bus unit; and (f) said debug inject/extract unit being operatively coupled to (i) receive debug information from at least one other of said plurality of units via the move controller bus and (ii) send debug information to at least one other of said plurality of units via the internal debug bus, said debug inject/extract unit having (1) means for sending data to a register internal to the VLSI processor, (2) means for receiving data from a register internal to the VLSI processor, (3) means for sending a service-request signal to the debug bus unit, and (4) means for receiving a service-request acknowledgment signal from the debug bus unit.

17. An on-chip debug system, having a plurality of units, for a programmable VLSI processor, said on-chip debug system referred to as a debug port, comprising:

(a) a first internal bus referred to as the internal debug bus;

(b) a second internal bus referred to as the move controller bus;

(c) a debug bus unit for exchanging information between the debug port and an external interface module, said debug bus unit operatively coupled (1) to receive debug information from at least one of said plurality of units via the internal debug bus and (2) to send debug information to at least one of said plurality of units via the move controller bus;

(d) a debug command unit for decoding and executing a debug command, said debug command unit operatively coupled (1) to receive a debug command from at least one of said plurality of units via the move controller bus, (2) to receive a debug command from the VLSI processor, (3) to selectively send debug status and timer information to at least one of said plurality of units via the internal debug bus, and (4) to selectively send a debug port enable signal to at least one of said plurality of units; and (e) a debug inject/extract unit for sending task-data to a task being executed by the VLSI processor and for receiving task-data generated by the task, said debug inject/extract unit operatively coupled (1) to receive debug information from at least one of said plurality of units via the move controller bus and (2) to send debug information to at least one of said plurality of units via the internal debug bus.

18. The on-chip debug system for a programmable VLSI processor of claims 16 or 17, wherein said status signals encode information representative of one or more of (1) state of a user flag, (2) availability of a temporary memory within the debug bus unit, (3) state of a watchdog counter, (4) filled status of register memory internal to the debug inject/extract unit, (5) filled status of register memory internal to the debug command unit, and (6) operational mode of the VLSI processor.

19. The on-chip debug system for a programmable VLSI processor of claims 16 or 17, wherein said enable signals encode information to enable and disable the operation of a real-time counter.

20. The on-chip debug bus unit for a VLSI processor of claims 16 or 17, wherein said service-request signal is selected from the group consisting of dbc16c.sr, dbc32c.sr, dbc32d.sr, dbg.sr, dbs.sr, rtcc.sr, rtcv.sr, wdt.sr, djs0.sr, djs1.sr, djs2.sr, djs3.sr, djr0.sr, djr1.sr, djr2.sr, djr3.sr, djow0.sr, djow1.st, djow2.sr, and djow3.sr.

21. A debug development system for a programmable VLSI processor, comprising:
(a) an on-chip debug port in accordance with claim 1 operatively coupled to the VLSI processor, said debug port incorporating an interface circuit;
(b) an external host processor; and
(b) an interface circuit between the host processor and the debug port's interface circuit operatively configured to permit communication.

22. An on-chip debug bus unit for a VLSI processor comprising:
(a) means for sending signals to and receiving signals from an external interface module at an external interface data exchange rate;
(b) means for receiving a service-request signal from an on-chip source external to the debug bus unit;
(c) means for generating a service-request acknowledgment signal for an on-chip destination external to the debug bus unit;
(d) means for generating a message header signal;
(e) means for (1) receiving and storing said message header signal and (2) storing a debug information signal received from an on-chip source external to the debug bus unit; and
(f) means for synchronizing the external interface data exchange rate and an internal debug bus unit data exchange rate.

23. The on-chip debug bus unit for a VLSI processor of claim 22, wherein the means for storing said message header signal and debug information signal consists of an output FIFO memory configured to store a plurality of 16-bit units of information.

24. The on-chip debug bus unit for a VLSI processor of claim 22, wherein the external interface module sends and receives signals encoding 8-bits of information at a time.

25. The on-chip debug bus unit for a VLSI processor of claim 24, wherein the debug bus unit reformats consecutively received 8-bit signals from said external interface module to a 16-bit signal for an on-chip destination external to the debug bus unit.

26. The on-chip debug bus unit for a VLSI processor of claim 22, wherein said means for receiving a service-request signal is configured to receive a service-request signal selected from the group consisting of dbc16c.sr, dbc32c.sr, dbc32d.sr, dbg.sr, dbs.sr, rtcc.sr, rtcv.sr, wdt.sr, dbd0.sr, dbd1.sr, dbdj.sr, diow.sr, djs0.sr, djs1.sr, djs2.sr, djs3.sr, djr0.sr, djr1.sr, djr2.sr, djr3.sr, djow0.sr, djow1.sr, djow2.sr, djow3.sr, df16.sr, df32.sr.

27. An on-chip debug bus unit for a VLSI processor comprising:
(a) a service request arbitrator circuit for (1) receiving a service request signal, (2) generating a service request acknowledgment signal, and (3) generating a message header command signal;
(b) a header generator circuit, operatively coupled to (1) receive a message header command signal from the service request arbitrator circuit and (2) generate a message header signal;
(c) an output FIFO memory operatively coupled to (1) receive and store a message header signal from the header generator circuit and (2) receive and store a message information signal from an on-chip source that is external to the debug bus unit;
(d) an output FIFO memory write control circuit operatively coupled to (1) receive a write command signal from the service request arbitrator circuit, (2) generate a write command signal to the output FIFO memory, and (3) generate a write address signal to the output FIFO memory;
(e) a protocol logic circuit operatively coupled to (1) receive read and write command signals from an off-chip source, (2) generate request and acknowledgment command signals to the off-chip source, and (3) generate a read command signal;
(f) an output FIFO memory read control circuit operatively coupled to (1) receive a read command signal from the protocol logic circuit, (2) generate a read command signal to the output FIFO memory, and (3) generate a read address signal to the output FIFO memory;
(g) a MUX circuit operatively coupled to (1) receive a signal from the output memory FIFO representative of a previously stored message composed of a message header signal portion and a message information signal portion, (2) receive a byte select signal from the output FIFO memory read control circuit, (3) generate an output message signal for transmission to the off-chip source; and
(h) a move controller circuit operatively coupled to (1) receive a signal from the off-chip source at an external data exchange rate and (2) transmit a reformatted signal to an on-chip source that is external to the debug bus unit at an internal debug bus unit data exchange rate.

28. The on-chip debug bus unit for a VLSI processor of claim 27, wherein said output FIFO memory is configured to store a plurality of 16-bit units of information.

29. The on-chip debug bus unit for a VLSI processor of claim 28, wherein said output message signal consists of a most-significant byte signal followed by a least-significant byte signal.

30. The on-chip debug bus unit for a VLSI processor of claim 27, wherein the signal received from the off-chip source is a byte-wide signal.

31. The on-chip debug bus unit for a VLSI processor of claim 27, wherein said service request arbitrator circuit is configured to receive a service-request signal selected from the group consisting of dbc16c.sr, dbc32c.sr, dbc32d.sr, dbg.sr, dbs.sr, rtcc.sr, rtcv.sr, wdt.sr, dbd0.sr, dbd1.sr, dbdj.sr, diow.sr, djs0.sr, djs1.sr, djs2.sr, djs3.sr, djr0.sr, djr1.sr, djr2.sr, djr3.sr, djow0.sr, djow1.sr, djow2.sr, djow3.sr, df16.sr, df32.sr.

32. An on-chip debug command unit for a VLSI processor comprising:

(a) a means for receiving a command message signal from an on-chip source external to the debug command unit;

(b) a means for receiving a command message signal from the VLSI processor;

(c) means for generating a selected command signal;

(d) means for decoding the selected command signal;

(e) a means for generating an output message signal for an on-chip source external to the debug command unit;

(f) means for receiving a service-request signal from an on-chip source external to the debug command unit;

(g) means for generating a service-request acknowledgment signal for an on-chip destination external to the debug command unit;

(h) means for receiving and storing a status information signal;

(i) means for receiving and storing a device enable signal; and (j) means for generating a time-signal encoding a real-time clock value.

33. The on-chip debug command unit for a VLSI processor of claim 32, wherein the means for receiving and storing a status information signal is configured to receive and store status signals selected from the group consisting of: state of a user flag, availability of a temporary memory within a debug bus unit, state of a watchdog counter, filled status of register memory internal to the debug command unit, filled status of register memory internal to a debug inject/extract unit, filled status of register memory internal to a debug instruction unit, and operational mode of the VLSI processor.

34. The on-chip debug command unit for a VLSI processor of claim 32, wherein the means for receiving and storing a device enable signal is configured to receive and store enable signals selected from the group consisting of RTCE, RSPBE, RSPB, SMME, PROME, DROME, DFE, NEXCE, QEXCE, SMME, and DAE.

35. An on-chip debug command unit for a programmable VLSI processor, said VLSI processor having a data bus, comprising:

(a) a DBE register for receiving a command message signal from an on-chip source external to the debug command unit;

(b) a DBC register for (1) receiving a message signal from the VLSI processor's data bus, (2) receiving a load signal, and (3) generating an output message signal for transmission to an on-chip source external to the debug command unit;

(c) a service request logic circuit for (1) generating a service request signal, (2) receiving a service request acknowledgment signal, and (3) generating a DBC register load signal;

(d) a MUX control logic circuit for (1) receiving a command message signal from the DBE register, (2) receiving a message signal from the DBC register, and (3) generating a selected command signal;

(e) a command decode logic circuit for (1) receiving the selected command signal, (2) generating a decoded command signal, and (3) generating an enable signal;

(f) a DBS register for (1) receiving a status information signal, and (2) latching said status information signal for subsequent retrieval by on-chip source external to the debug command unit;

(g) a DBG register for (1) receiving a device enable signal, and (2) latching said device enable signal for subsequent retrieval by on-chip sources external to the debug command unit; and (h) a real-time counter circuit, having a real-time clock, for (1) receiving a real-time request signal, and (2) generating a time-signal encoding the real-time clock's value.

36. The on-chip debug command unit for a VLSI processor of claim 35, wherein said DBC register is a 32-bit double-buffered register.

37. The on-chip debug command unit for a VLSI processor of claim 35, wherein said DBG register is configured to receive and latch enable signals selected from the group consisting of RTCE, RSPBE, RSPB, SMME, PROME, DROME, DFE, NEXCE, QEXCE, SMME, and DAE.

38. The on-chip debug command unit for a VLSI processor of claim 35, wherein said real-time clock is a 32-bit counter.

39. An on-chip debug instruction unit for a programmable VLSI processor, said VLSI processor having (i) a data bus, (ii) an address bus, and (iii) an instruction bus, comprising:

(a) means for receiving a data signal from an on-chip source external to the debug instruction unit;

(b) means for sending a VLSI instruction signal to a first VLSI processor register via the VLSI processor instruction bus;

(c) means for sending a VLSI data signal associated with the VLSI instruction signal to a second VLSI processor register via the VLSI processor data bus;

(d) means for sending a VLSI address signal associated with the VLSI instruction signal to a third VLSI processor register via the VLSI processor address bus;

(e) means for sending a service-request signal to an on-chip source external to the debug instruction unit; and (f) means for receiving a service-request acknowledgment signal from an on-chip source external to the debug instruction unit.

40. The on-chip debug instruction unit for a VLSI processor of claim 35, wherein said means for sending a service-request signal is configured to generate a service-request signal selected from the group consisting of dbd0.sr, dbd1.sr, dbdj.sr, and diow.sr.

41. An on-chip debug instruction unit for a programmable VLSI processor, said VLSI processor having (i) a data bus, (ii) an address bus, and (iii) an instruction bus, comprising:

(a) a DBB buffer for receiving a data signal from an on-chip source external to the debug instruction unit;

(b) a DBI register for (1) receiving a data signal from the DBB buffer and (2) generating an instruction signal for transmission to the VLSI processor instruction bus;

(c) a DBA register for (1) receiving a data signal from the DBB buffer, (2) generating an address signal for transmission to the VLSI processor address bus, (3) receiving a data signal from the VLSI processor data bus, and (4) generating a debug signal for transmission to an on-chip source external to the debug instruction unit;

(d) A DBD register for (1) receiving a data signal from the DBB buffer, (2) generating a data signal for transmission to the VLSI processor data bus, (3) receiving a data signal from the VLSI processor data bus, and (4) generating a debug signal for transmission to an on-chip source external to the debug instruction unit;

(e) a header register for (1) receiving a debug information signal from an on-chip source external to the debug instruction unit and (2) generating a command signal;

(f) an inject control logic circuit for decoding the command signal;

(g) a handshake logic circuit for controlling the transmission of said (1) address signal, (2) data signal, and (3) instruction signal to the VLSI processor; and (h) a service request logic circuit for (1) generating a service request signal, (2) receiving a service request acknowledgment signal.

42. The on-chip debug instruction unit for a VLSI processor of claim 41, wherein said DBB, DBI, and DBD registers are 32-bit registers.

43. The on-chip debug instruction unit for a VLSI processor of claim 41, wherein said DBA register is a 24-bit register.

44. The on-chip debug instruction unit for a VLSI processor of claim 41, wherein said service request logic circuit is configured to generate a service-request signal selected from the group consisting of dbd0.sr, dbd1.sr, dbdj.sr, and diow.sr.

45. An on-chip debug inject/extract unit for a programmable VLSI processor, said VLSI processor having a data bus, comprising:

(a) means for receiving and storing a data signal from a register internal to the VLSI processor via the VLSI processor data bus;

(b) means for receiving and storing a data signal from an on-chip source not internal to the VLSI processor and not the inject/extract unit;

(c) means for sending a data signal to an internal register of the VLSI processor via the VLSI processor data bus;

(d) means for sending a data signal to an on-chip source not internal to the VLSI processor and not the inject/extract unit;

(e) means for sending a service-request signal to the an on-chip source not internal to the VLSI processor and not the inject/extract unit; and (f) means for receiving a service-request acknowledgment signal.

46. The on-chip debug inject/extract unit for a VLSI processor of claim 45, wherein said means for sending a service-request signal is configured to send a service-request signal selected from the group consisting of djs0.sr, djs1.sr, djs2.sr, djs3.sr, djr0.sr, djr1.sr, djr2.sr, djr3.sr, djow0.sr, djow1.sr, djow2.sr, and djow3.sr.

47. An on-chip debug inject/extract unit for a programmable VLSI processor, said VLSI processor having a data bus, comprising:

(a) a header register for receiving a debug header signal from an on-chip source external to the debug inject/extract unit;

(b) a DJ0 register for (1) receiving a data signal from an on-chip source external to the debug inject/extract unit for transmission to the VLSI processor via the VLSI processor data bus and (2) receiving a data signal from the VLSI processor via the VLSI processor data bus for transmission to an on-chip destination external to the debug inject/extract unit and operatively coupled to the header register;

(c) a DJ0 flag register for storing service-request information associated with the DJ0 register and operatively coupled to the DJ0 register;

(d) a DJ1 register for (1) receiving a data signal from an on-chip source external to the debug inject/extract unit for transmission to the VLSI processor via the VLSI processor data bus and (2) receiving a data signal from the VLSI processor via the VLSI processor data bus for transmission to an on-chip destination external to the debug inject/extract unit and operatively coupled to the header register;

(e) a DJ1 flag register for storing service-request information associated with the DJ1 register and operatively coupled to the DJ1 register;

(f) a DJ2 register for (1) receiving a data signal from an on-chip source external to the debug inject/extract unit for transmission to the VLSI processor via the VLSI processor data bus and (2) receiving a data signal from the VLSI processor via the VLSI processor data bus for transmission to an on-chip destination external to the debug inject/extract unit and operatively coupled to the header register;

(g) a DJ2 flag register for storing service-request information associated with the DJ1 register and operatively coupled to the DJ2 register;

(h) a DJ3 register for (1) receiving a data signal from an on-chip source external to the debug inject/extract unit for transmission to the VLSI processor via the VLSI processor data bus and (2) receiving a data signal from the VLSI processor via the VLSI processor data bus for transmission to an on-chip destination external to the debug inject/extract unit and operatively coupled to the header register;

(i) a DJ3 flag register for storing service-request information associated with the DJ1 register and operatively coupled to the DJ3 register.

48. The on-chip debug inject/extract unit for a VLSI processor of claim 47, wherein said DJ0, DJ1, DJ2, and DJ3 registers are 32-bit registers.

49. The on-chip debug inject/extract unit for a VLSI processor of claim 47, wherein said DJ0 flag register, DJ1 flag register, DJ2 flag register, and DJ3 flag register are 5-bit registers.

50. The on-chip debug inject/extract unit for a VLSI processor of claim 49, wherein said DJ0 flag register, DJ1 flag register, DJ2 flag register, and DJ3 flag registers are configured to store signal-request information selected from the group consisting of djs0.sr, djs1.sr, djs2.sr, djs3.sr, djr0.sr, djr1.sr, djr2.sr, djr3.sr, djow0.sr, djow1.sr, djow2.sr, and djow3.sr.

* * * * *